United States Patent
Kurabayashi

(10) Patent No.: US 8,022,962 B2
(45) Date of Patent: Sep. 20, 2011

(54) IMAGE PROCESSING PROGRAM AND IMAGE PROCESSING APPARATUS

(75) Inventor: Akira Kurabayashi, Tokyo (JP)

(73) Assignees: Nintendo Co., Ltd., Kyoto (JP); Arika Co., Ltd., Tokyo (JP)

( * ) Notice: Subject to any disclaimer, the term of this patent is extended or adjusted under 35 U.S.C. 154(b) by 700 days.

(21) Appl. No.: 12/081,734

(22) Filed: Apr. 21, 2008

(65) Prior Publication Data

US 2009/0002365 A1  Jan. 1, 2009

(30) Foreign Application Priority Data

Jun. 27, 2007  (JP) .................................. 2007-168686

(51) Int. Cl.
*G06T 15/00* (2011.01)
*G09G 5/00* (2006.01)

(52) U.S. Cl. ........ 345/589; 345/419; 345/421; 345/422; 345/647; 382/264

(58) Field of Classification Search .................. None
See application file for complete search history.

(56) References Cited

U.S. PATENT DOCUMENTS 5,995,111 A * 11/1999 Morioka et al. .............. 345/592
6,295,070 B1 *  9/2001 Wood ........................... 345/582

FOREIGN PATENT DOCUMENTS

| JP | 10-222694 | | 8/1998 |
|---|---|---|---|
| JP | 11-242753 | | 9/1999 |
| JP | 2004240910 | A * | 8/2004 |

* cited by examiner

*Primary Examiner* — Kee M Tung
*Assistant Examiner* — Michelle Chin
(74) *Attorney, Agent, or Firm* — Nixon & Vanderhye P.C.

(57) ABSTRACT

A game apparatus includes a computer, and the computer reads rendering data from a rendering buffer, and displays a virtual three-dimensional image by utilizing color data and a depth value for each pixel which are included in the rendering data. When a photographing instruction is input, a focused position is detected on the basis of operation information. The computer calculates a difference between a depth value of each pixel included in the rendering data and a depth value of the focused position to generate color data which is subjected to blur processing with respect to blurring objective pixels, and writes the color data in the calculation buffer for each pixel. The computer generates a display image data including a blurred image on the basis of the color data of each pixel stored in the calculation buffer.

15 Claims, 13 Drawing Sheets

(A)

(B)

IMAGE PROCESSING PROGRAM AND IMAGE PROCESSING APPARATUS

CROSS REFERENCE OF RELATED APPLICATION

The disclosure of Japanese Patent Application No. 2007-168686 is incorporated herein by reference.

TECHNICAL FIELD

The example embodiment presented herein relates to an image processing program and an image processing apparatus. More specifically, the present invention relates to an image processing program and an image processing apparatus capable of realizing a real expression by adding blur.

BACKGROUND AND SUMMARY

For example, Patent Document 1 (Japanese Patent Laid-open No. 10-222694 [G06T 15/00, 15/40]) recites that information on a degree of influence which image data of each pixel imparts on the surrounding pixels is stored as a blur value in a unit of pixel, and blur processing according to the blur value for each pixel is performed, and whereby an image on which blur processing is performed is displayed. The blur value is evaluated by computing a difference, etc. between a Z value for each pixel and depth of field.

Furthermore, Patent Document 2 (Japanese Patent Laid-open No. 11-242753 [G06T 15/00, 17/00, 15/40]) recites that on the basis of a deviation between a Z value held in each pixel of the three-dimensional graphics and a depth of field, a copy pixel distance of the pixel is calculated, and a luminance value of the pixel is equally divided and distributed to a plurality of adjacent pixels away from the pixel by the pixel copying distance in a predetermined direction, and whereby, a blur processing is performed.

The above-described Patent Document 1 is for calculating a degree of influence of each pixel imparted on the surrounding pixels as a blur value, but is not for calculating a range where each pixel is blurred. That is, in the Patent Document 1, the blurring range where each pixel is blurred is fixedly decided to be the surrounding pixels. Thus, the blurring ranges of respective pixels become uniform, resulting in an unnatural blur expression.

Furthermore, the above-described Patent Document 2 is for deciding adjacent pixels in which luminance is dispersed depending on the pixel copying distance calculated on the basis of a Z value of each pixel and the depth of field deviation, and is not for calculating a blurring range. That is, in the Patent Document 2, the number of adjacent pixels in which luminance is dispersed is decided in advance (four, for example). Accordingly, the Patent Document 2 also has a problem the same as the Patent Document 1.

Therefore, it is a primary feature of the present embodiment to provide a novel image processing program and image processing apparatus.

Another feature of the present embodiment is to provide an image processing program and an image processing apparatus capable of realizing a natural blur expression.

The present embodiment employs following features in order to solve the above-described problems. It should be noted that reference numerals inside the parentheses and supplements show one example of a corresponding relationship with the embodiments described later for easy understanding of the present embodiment, and do not limit the present embodiment.

A storage medium which machine-readably stores an image processing program by a computer of an image processing apparatus for displaying a virtual three-dimensional image by utilizing rendering data including color data and a depth value for each pixel, the image processing program causes the computer to execute a detecting step for detecting a focused position, a blur range calculating step for calculating for each pixel a difference between a depth value of the pixel and a depth value of the focused position which are included in the rendering data, and calculating a blurring range on the basis of the difference, a color data generating step for generating color data which is subjected to blurring processing as to blurring objective pixels specified on the basis of the blurring range, and a display image generating step for generating display image data on the basis of the color data generated by the color data generating step.

In the first embodiment, an image processing program is executed by a computer (40) of a game apparatus (12) in this embodiment. The computer (40) reads rendering data from a rendering buffer (136), and displays a virtual three-dimensional image by utilizing color data (R0, G0, B0) and a depth value (Z) for each pixel which are included in the rendering data. In a detecting step (S23), the computer detects a focused position when a virtual three-dimensional image is photographed on the basis of the operation information, for example. In a blur range calculating step (S25, S29), the computer calculates, for each pixel, a difference between a depth value (DZ) of the pixel (Dn) included in the rendering data and a depth value (PZ) of the focused position read from the rendering data, and calculates a blurring range on the basis of the foregoing difference. In a color data generating step (S31, S33, S35, S37), as to a blurring objective pixel included in the blurring range, by a method of modifying the color data included in the rendering data by a diffusion value, for example, color data on which blur processing is performed is generated. Here, the diffusion value relates to a value of a degree of blur for each pixel, and is a value relating to the foregoing difference, for example. The generated color data is written to the calculation buffer, for example, for each pixel. In a display image generating step (S43), the computer generates display image data (output color data) including a blurred image on the basis of the color data of each of the pixels stored in the rendering buffer.

According to the first embodiment, the blurring objective pixel is specified by the blurring range calculated on the basis of the difference between the depth value (DZ) of each pixel (Dn) and the depth value (PZ) of the focused position, and color data which is subjected to the blur processing depending on the difference for each blurring objective pixel is generated, and therefore, it is possible to realize a more natural blur expression.

A second embodiment is a storage medium, wherein the color data generating step of the image processing program includes a blurring objective pixel specifying step for specifying a blurring objective pixel.

In the second embodiment, the computer executes a blurring objective pixel specifying step (S35, S37) in the color data generating step to specify an objective pixel on which blur processing has to be performed. According to the second embodiment, it is easily specify the pixels as a blur object.

A third embodiment is a storage medium, wherein the blurring objective pixel specifying step of the image processing program includes a matching step for matching the blurring range and blurring shape data set in advance to specify the blurring objective pixels.

In the third embodiment, the computer specifies blurring objective pixels by executing a matching step (S35) for matching a blurring range and the blurring shape data (hexagon, for example) set in advance. According to the third embodiment, by changing the blurring shape, it is possible to easily change the range (or the shape of the range) of the blurring objective pixels.

A fourth embodiment is a storage medium, and wherein the color data generating step of the image processing program includes a diffusion value calculating step for calculating a diffusion value of each of the pixels included in the blurring range calculated by the blur range calculating step and a color data changing step for changing, on the basis of the diffusion value, the color data included in the rendering data of the pixel determined as a blur object by the matching step.

In the fourth embodiment, in a diffusion value calculating step (S31, S33), the computer calculates a diffusion value (DR, DG, DB) of each of the pixels included in the blurring range calculated by the blur range calculating step. In a color data changing step (S37), the color data included in the rendering data of the pixel determined as a blur object by the matching step (S35) is changed on the basis of the diffusion value. For example, R1=R1+DR, G1=G1+DG, and B1=B1+DB. The weight data is H+DH. According to the fourth invention, it is possible to easily calculate color data (and weight data as required) on which blur processing is performed depending on the degree of the blur.

A fifth embodiment is a storage medium, wherein the diffusion value calculating step of the image processing program includes a weight calculating step for calculating a weight on the basis of an arithmetic expression which is proportion to a size of the color data of each pixel included in the rendering data and is inversely proportion to a size of the blurring range, and the diffusion value is calculated on the basis of the weight.

In the fifth embodiment, the computer first calculates a weight (DH), and calculates a diffusion value on the basis of the weight. In this embodiment, each of the color components R, G, and B is regarded as a vector, and the strength of the light is represented by the magnitude. The coefficient value representing a magnitude of the so-called "color vector" is "weight". According to the fifth embodiment, since the degree of blurring the pixels can be calculated so as to be in proportion to the size of the color data and is inversely proportion to the size of the blurring range, it is possible to make the blur expression more natural.

A sixth embodiment is a storage medium, wherein the image processing program causes the computer to further execute a determining step for determining whether or not a photographing instruction is input, the detecting step detects a focused position when it is determined by the determining step that a photographing instruction is input, and the color data generating step includes a color data changing step for changing the color data included in the rendering data on the basis of a diffusion value with respect to the blurring objective pixels.

In the sixth embodiment, a photographing instruction can be input to the computer by operating an operating device (the controller for the game apparatus) by the user, for example, and the computer determines whether or not such a photographing instruction is input by a determining step (S9). When determining that a photographing instruction is input, the computer detects a focused position when a virtual three-dimensional image is photographed on the basis of the operation information in a detecting step (S23). A color data generating step changes color data included in the rendering data for each of the blurring objective pixels on the basis of the diffusion value to thereby generate color data which is subjected to the blur processing. According to the sixth embodiment, it is possible to easily evaluate color data for a blurred image.

A seventh embodiment is a storage medium, and wherein the image processing program causes the computer to further execute an operation information acquiring step for acquiring operation information by the user, wherein the detecting step specifies a pixel designated on the basis of the operation information, and detects a depth value of the pixel as the focused position.

In the seventh embodiment, the computer fetches operation information by the user in an operation information acquiring step (S5), and specifies a pixel which the user designates as a pixel to be focused on the basis of the operation information, and detects a depth value of the pixel as a focused position in a detecting step (S23). According to the seventh embodiment, it is possible to make the user freely select an arbitrary position as a focused position in the virtual three-dimensional image.

An eighth embodiment is an image processing apparatus which displays a virtual three-dimensional image by utilizing rendering data including color data and a depth value for each pixel, comprises: a detecting means for detecting a focused position, a blurring range calculating means for calculating for each pixel a difference between a depth value of the pixel and a depth value of the focused position which are included in the rendering data, and calculating a blurring range on the basis of the difference, a color data generating means for generating color data which is subjected to blur processing with respect to blurring objective pixels specified on the basis of the blurring range, and a display image generating means for generating display image data on the basis of the color data generated by the color data generating means.

In the eighth embodiment, a game apparatus (12) in this embodiment is assumed as an image processing apparatus. The computer (40) of the game apparatus reads rendering data from a rendering buffer (136), for example, and displays a virtual three-dimensional image (game image) by utilizing color data (R0, G0, B0) for each pixel and a depth value (Z) which are included in the rendering data. Furthermore, each of the means can be specified as a program step to be executed by the computer. For example, in response to a photographing instruction, the detecting means (40, S23) detects a focused position when a virtual three-dimensional image is photographed. A blurring range calculation means (S25, S29) calculates, for each pixel, a difference between a depth value (DZ) of the pixel (Dn) included in the rendering data and a depth value (PZ) of the focused position read from the rendering data, and calculates a blurring range on the basis of the above-described difference. By a color data generating means (S31, S33, S35, S37), as to blurring objective pixels included in the blurring range, by a method of modifying the color data included in the rendering data by a diffusion value, for example, color data on which blur processing is performed is generated, and the generated color data is written to the calculation buffer for each pixel, for example. A display image generating means (S43) generates display image data (output color data) including a blurred image on the basis of the color data of each pixel stored in the rendering buffer.

The eighth embodiment has an advantage similar to the above-described image processing program of the first embodiment.

According to the present embodiment, since color data which is subjected to the blur processing as to the blurring objective pixel specified by the blurring range calculated between a depth value of each pixel and a depth value of the focused position, it is possible to realize a more natural blur expression.

The above described features, aspects and advantages of the present embodiment will become more apparent from the following detailed description of the present embodiment when taken in conjunction with the accompanying drawings.

BRIEF DESCRIPTION OF THE DRAWINGS

FIG. 3(A) is a perspective view of the controller as seeing it from above rear, and FIG. 3(B) is a perspective view of the controller as seeing it from below front.

DETAILED DESCRIPTION OF THE PREFERRED EMBODIMENTS

Figure 1:
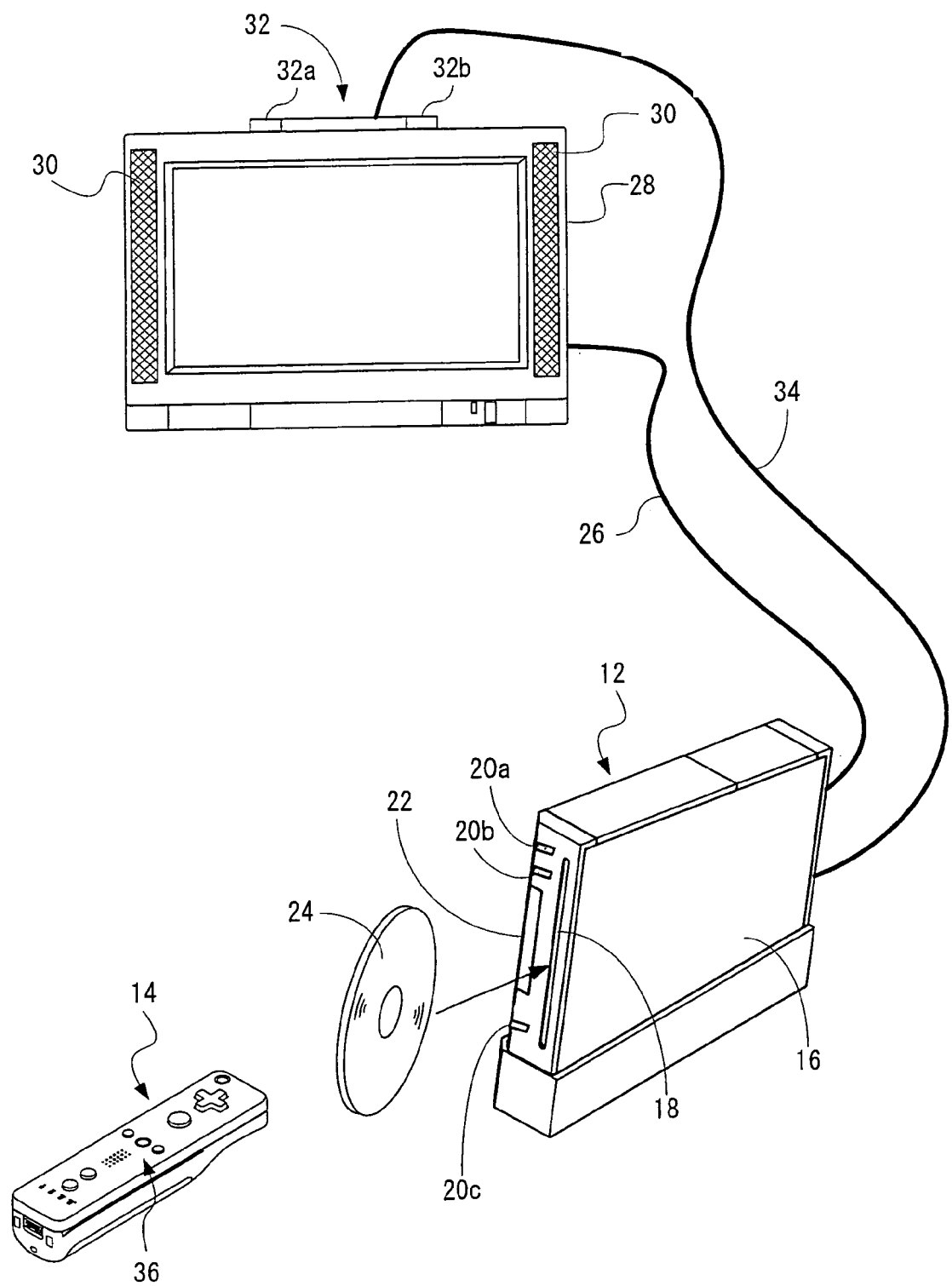
FIG. 1 is an appearance view showing an outline of a game system of one embodiment.

Referring to FIG. 1, a game system 10 being one embodiment includes a video game apparatus (hereinafter simply referred to as "game apparatus") 12 and a controller 14. It should be noted that although game image processing is explained as one example of image processing in this embodiment discussed below, image processing to which the present invention can be applied is not restricted to the game image processing. In this sense, the game system 10 shown in FIG. 1 can be called an image processing system, and the game apparatus 12 can be called an image processing apparatus.

The game apparatus 12 in this embodiment is designed so as to be communicably connectable with a maximum of four controllers 14. Also, the game apparatus 12 and each of the controllers 14 are connected by radio. For example, wireless communication is executed according to Bluetooth (registered trademark) standard, and may be executed by other standards, such as infrared rays and wireless LAN. Alternatively, they may be connected by a wire.

The game apparatus 12 includes a roughly rectangular parallelepiped housing 16, and the housing 16 is furnished with a disk slot 18 on a front surface. An optical disk 24 as one example of an information storage medium storing game program, etc. is inserted from the disk slot 18 to be loaded into a disk drive 54 (see FIG. 2) within the housing 16. Although illustration is omitted, around the disk slot 18, an LED and a light guide plate are arranged such that the LED of the disk slot 18 lights on or off in accordance with various processing.

Furthermore, on a front surface of the housing 16 of the game apparatus 12, a power button 20a and a reset button 20b are provided at the upper part thereof, and an eject button 20c is provided below them. In addition, a connector cover for external memory card 22 is provided between the reset button 20b and the eject button 20c, and in the vicinity of the disk slot 18. Inside the connector cover for external memory card 22, an external connector for memory card 62 (see FIG. 2) is provided, through which an external memory card (hereinafter simply referred to as a "memory card") not shown is inserted. The memory card is employed for loading the game program, etc. read from the optical disk 24 to temporarily store it, storing (saving) game data (result data or proceeding data of the game) of the game played by means of the game system 10, and so forth. It should be noted that storing the game data described above may be performed on an internal memory, such as a flash memory 44 (see FIG. 2) inside the game apparatus 12 in place of the memory card. Also, the memory card may be utilized as a backup memory of the internal memory. In addition, in the game apparatus 12, other application except for the game may be executed, and in such a case, data of the other application can be stored in the memory card.

It should be noted that a general-purpose SD card can be employed as a memory card, but other general-purpose memory cards, such as memory sticks, multimedia cards (registered trademark) can be employed.

Although omitted in FIG. 1, the game apparatus 12 has an AV cable connector 58 (FIG. 2) on the rear surface of the housing 16, and by utilizing the AV cable connector 58, a monitor 28 and a speaker 30 are connected to the game apparatus 12 through an AV cable 26. The monitor 28 and the speaker 30 are typically a color television receiver, and through the AV cable 26, a video signal from the game apparatus 12 is input to a video input terminal of the color television, and a sound signal from the game apparatus 12 is input to a sound input terminal. Accordingly, a game image of a three-dimensional (3D) video game, for example, is displayed on the screen of the color television (monitor) 28, and stereo game sound, such as a game music, a sound effect, etc. is output from right and left speakers 30. Around the monitor 28 (on the top side of the monitor 28, in this embodiment), a marker unit 32 including two infrared ray LEDs (markers) 32a and 32b is provided. The marker unit 32 is connected to the game apparatus 12 through a power source cable 34. Accordingly, the marker unit 32 is supplied with power from the game apparatus 12. Thus, the markers 32a and 32b emit lights in front of the monitor 28.

Furthermore, the power of the game apparatus 12 is applied by means of a general AC adapter (not illustrated). The AC adapter is inserted into a standard wall socket for home use, and the game apparatus 12 transforms the house current (commercial power supply) to a low DC voltage signal suitable for driving. In another embodiment, a battery may be utilized as a power supply.

In the game system 10, a user or a player turns the power of the game apparatus 12 on for playing the game (or applications other than the game). Then, the user selects an appropriate optical disk 24 storing a program of a video game (or other applications the player wants to play), and loads the optical disk 24 into the disk drive 54 of the game apparatus 12. In response thereto, the game apparatus 12 starts to execute a video game or other applications on the basis of the program recorded in the optical disk 24. The user operates the controller 14 in order to apply an input to the game apparatus 12. For example, by operating any one of the operating buttons of the input means 36 including operating buttons, etc., a game or other application is started. Besides the operation on the input means 36, by moving the controller 14 itself, it is possible to move a moving image object (player object) in different directions or change the perspective of the user (camera position) in a 3-dimensional game world.

It should be noted that programs of video games and other applications are stored (installed) in an internal memory (flash memory 44 (see FIG. 2)) of the game apparatus 12, and executed from the internal memory. In such a case, a program stored in a storage medium like an optical disk 24, or the like may be installed onto the internal memory, and the downloaded program may be installed onto the internal memory.

Figure 2:
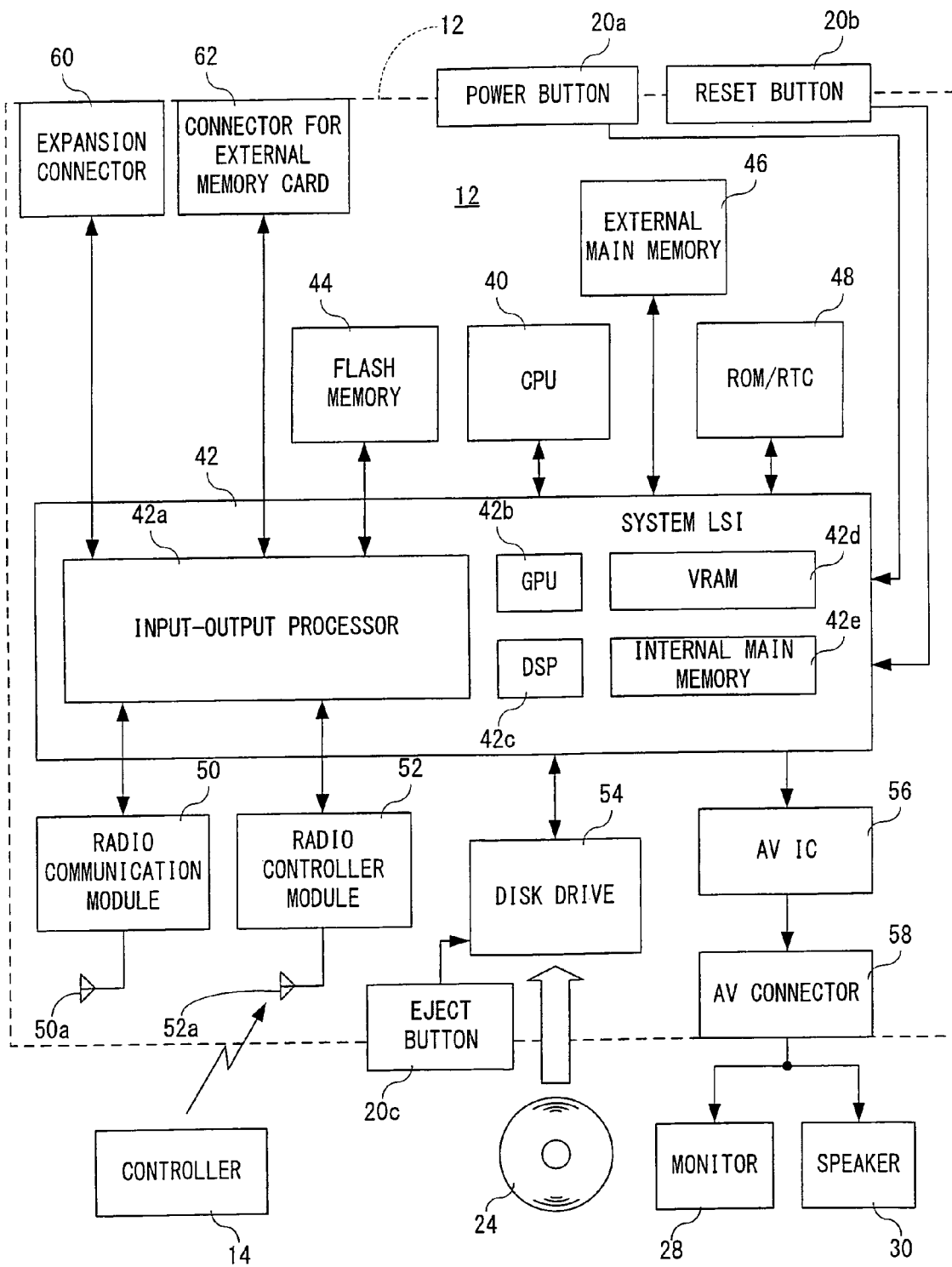
FIG. 2 is a block diagram showing one example of an electric configuration of the game system.

FIG. 2 is a block diagram of an electric configuration of the video game system 10 in FIG. 1 embodiment. Although illustration is omitted, respective components within the housing 16 are mounted on a printed board. As shown in FIG. 2, the game apparatus 12 has a CPU 40, and functions as a game processor. The CPU 40 is connected with a system LSI 42. The system LSI 42 is connected with an external main memory 46, a ROM/RTC 48, a disk drive 54, and an AV IC 56.

The external main memory 46 is utilized as a work area and a buffer area of the CPU 40 by storing programs like a game program, etc. and various data. The ROM/RTC 48, which is a so-called boot ROM, is incorporated with a program for activating the game apparatus 12, and is provided with a time circuit for counting a time. The disk drive 54 reads program data, texture data, etc. from the optical disk 24, and writes it in an internal main memory 42e described later or the external main memory 46 under the control of the CPU 40.

The system LSI 42 is provided with an input-output processor 42a, a GPU (Graphics Processor Unit) 42b, a DSP (Digital Signal Processor) 42c, a VRAM 42d and an internal main memory 42e, and these are connected with each other by internal buses although illustration is omitted.

The input-output processor 42a executes transmitting and receiving data and executes downloading of the data.

The GPU 42b is made up of a part of a rendering means, and receives a graphics command (construction command) from the CPU 40 to generate game image data according to the command. Additionally, the CPU 40 applies an image generating program required for generating game image data to the GPU 42b in addition to the graphics command.

Although illustration is omitted, the GPU 42b is connected with the VRAM 42d as described above. The GPU 42b accesses the VRAM 42d to acquire data (image data: data such as polygon data, texture data, etc.) required to execute the construction instruction. Additionally, the CPU 40 writes image data required for drawing to the VRAM 42d via the GPU 42b. The GPU 42b accesses the VRAM 42d to create game image data for drawing.

In this embodiment, a description is made on a case that the GPU 42b generates game image data, but in a case of executing an arbitrary application except for the game application, the GPU 42b generates image data as to the arbitrary application.

Furthermore, the DSP 42c functions as an audio processor, and generates audio data corresponding to a sound, a voice, music, or the like to be output from the speaker 30 by means of the sound data and the sound wave (tone) data stored in the internal main memory 42e and the external main memory 46.

The game image data and audio data generated as described above are read by the AV IC 56, and output to the monitor 28 and the speaker 30 via the AV connector 58. Accordingly, a game screen is displayed on the monitor 28, and a sound (music) necessary for the game is output from the speaker 30.

Furthermore, the input-output processor 42a is connected with an expansion connector 60 and a connector for memory card 62 as well as a flash memory 44, a radio communication module 50 and a radio controller module 52. The radio communication module 50 is connected with an antenna 50a, and the radio controller module 52 is connected with an antenna 52a.

The input-output processor 42a can communicate with other game apparatuses and various servers to be connected to a network (not shown) via a radio communication module 50. It should be noted that it is possible to directly communicate with another game apparatus without going through the network. The input-output processor 42a periodically accesses the flash memory 44 to detect the presence or absence of data (referred to as data to be transmitted) being required to be transmitted to the network, and transmits it to the network via the radio communication module 50 and the antenna 50a in a case that data to be transmitted is present. Furthermore, the input-output processor 42a receives data (referred to as received data) transmitted from another game apparatuses via the network, the antenna 50a and the radio communication module 50, and stores the received data in the flash memory 44. If the received data does not satisfy a predetermined condition, the reception data is abandoned as it is. In addition, the input-output processor 42a can receive data (download data) downloaded from the download server (not shown) via the network, the antenna 50a and the radio communication module 50, and store the download data in the flash memory 44.

Furthermore, the input-output processor 42a receives input data transmitted from the controller 14 via the antenna 52a and the radio controller module 52, and (temporarily) stores it in the buffer area of the internal main memory 42e or the external main memory 46. The input data is erased from the buffer area after being utilized in processing by the CPU 40 (game processing, for example).

In this embodiment, as described above, the radio controller module 52 makes communications with the controller 14 in accordance with Bluetooth standards.

In addition, the input-output processor 42a is connected with the expansion connector 60 and the connector for memory card 62. The expansion connector 60 is a connector for interfaces, such as USB, SCSI, etc., and can be connected with medium such as an external storage, and peripheral devices such as another controller other than the controller 14. Furthermore, the expansion connector 60 is connected with a cable LAN adaptor, and can utilize the cable LAN in place of the radio communication module 50. The connector for memory card 62 can be connected with an external storage like a memory card. Thus, the input-output processor 42a, for example, accesses the external storage via the expansion connector 60 and the connector for memory card 62 to store and read the data.

Although a detailed description is omitted, as shown in FIG. 1, the game apparatus 12 (housing 16) is furnished with the power button 20a, the reset button 20b, and the eject button 20c. The power button 20a is connected to the system LSI 42. When the power button 20a is turned on, the system LSI 42 is set in a mode of a normal energized state in which the respective components of the game apparatus 12 are supplied with power through an AC adapter not shown (referred to as "normal mode"). On the other hand, when the power button 20a is turned off, the system LSI 42 is set to a mode in which a part of the components of the game apparatus 12 is supplied with power, and the power consumption is reduced to minimum (hereinafter referred to as "standby mode").

In this embodiment, in a case that the standby mode is set, the system LSI 42 issues an instruction to stop supplying the power to the components except for the input-output processor 42a, the flash memory 44, the external main memory 46, the ROM/RTC 48 and the radio communication module 50, and the radio controller module 52. Accordingly, in this embodiment, the CPU 40 never executes an application in the stand-by mode.

Although the system LSI 42 is supplied with power even in the standby mode, supply of clocks to the GPU 42b, the DSP 42c and the VRAM 42d are stopped so as not to be driven, realizing reduction in power consumption.

Although illustration is omitted, inside the controller 16 of the game apparatus 12, a fan is provided for excluding heat of the IC, such as the CPU 40, the system LSI 42, etc. to outside. In the standby mode, the fan is also stopped.

However, in a case that the standby mode is not desired, when the power button 20a is turned off, by making the standby mode unusable, the power supply to all the circuit components are completely stopped.

Furthermore, switching between the normal mode and the standby mode can be performed by turning on and off the power switch 86 (FIG. 3) of the controller 14 by remote control. If the remote control is not performed, setting is made such that the power supply to the radio controller module 52a is not performed in the standby mode.

The reset button 20b is also connected with the system LSI 42. When the reset button 20b is pushed, the system LSI 42 restarts the activation program of the game apparatus 12. The eject button 20c is connected to the disk drive 54. When the eject button 20c is pushed, the optical disk 18 is removed from the disk drive 54.

Each of FIG. 3(A) to FIG. 3(B) shows one example of an external appearance of the controller 14. FIG. 3(A) is a perspective view showing a front end surface, a top surface and a right side surface of the controller 14, and FIG. 3(B) is a perspective view showing a back end surface, a lower surface and a left side surface of the controller 14.

Referring to FIG. 3(A) and FIG. 3(B), the controller 14 has a housing 70 formed by plastic molding, for example. The housing 70 is formed into an approximately rectangular parallelepiped shape and has a size small enough to be held by one hand of a user. The housing 70 (controller 14) is provided with the input means (a plurality of buttons or switches) 36 as described above. Specifically, as shown in FIG. 3(A), on an upper face of the housing 70, there are provided a cross key 72, a 1 button 74, a 2 button 76, an A button 78, a – (minus) button 80, a HOME button 80, a + (plus) button 84 and a power switch 86. Moreover, as shown in FIG. 3(B) an inclined surface is formed on a lower surface of the housing 70, and a B-trigger switch 88 is formed on the inclined surface.

The cross key 72 is a four directional push switch, including four directions of front (or upper), back (or lower), right and left operation parts. By operating any one of the operation parts, it is possible to instruct a moving direction of a character or object (player character or player object) that is be operable by a player or instruct the moving direction of a cursor.

The 1 button 74 and the 2 button 76 are respectively push button switches, and are used for a game operation such as adjusting a viewpoint position and a viewpoint direction on displaying the 3D game image, i.e. a position and an image angle of a virtual camera. Alternatively, the 1 button 74 and the 2 button 76 can be used for an operation the same as that of the A button 78 and the B-trigger switch 88 or an auxiliary operation.

The A-button switch 78 is the push button switch, and is used for causing the player character or the player object to take an action other than a direction instruction, specifically arbitrary actions such as hitting (punching), throwing, grasping (acquiring), riding, and jumping, etc. For example, in an action game, it is possible to give an instruction to jump, punch, move a weapon, and so forth. Also, in a roll playing game (RPG) and a simulation RPG, it is possible to instruct to acquire an item, select and determine the weapon and command, and so forth. Furthermore, the A button switch 78 is used for instructing decision of an icon or a button image pointed by the pointer (instruction image) on the game screen. For example, when the icon and the button image are decided, an instruction or a command (command of the game) set in advance corresponding thereto can be input.

The – button 80, the HOME button 82, the + button 84, and the power supply switch 86 are also push button switches. The – button 80 is used for selecting a game mode. The HOME button 82 is used for displaying a game menu (menu screen). The + button 84 is used for starting (re-starting) or pausing a game. The power supply switch 86 is used for turning on/off a power supply of the game apparatus 12 by remote control.

In this embodiment, note that the power supply switch for turning on/off the controller 14 itself is not provided, and the controller 14 is set at on-state by operating any one of the switches or buttons of the input means 36 of the controller 14, and when not operated for a certain period of time (30 seconds, for example) or more, the controller 14 is automatically set to an off-state.

The B-trigger switch 88 is also the push button switch, and is mainly used for making an input like a trigger such as shooting, and designating a position selected by the controller 14. In a case that the B-trigger switch 88 is continued to be pushed, it is possible to make movements and parameters of the player object constant. In a fixed case, the B-trigger switch 88 functions in the same way as a normal B-button, and is used for canceling an action or a command determined by the A button 78.

As shown in FIG. 3(A), an external expansion connector 90 is provided on a back end surface of the housing 70, and as shown in FIG. 3(B), an indicator 92 is provided on the top surface and the side of the back end surface of the housing 70. The external expansion connector 90 is utilized for connecting another expansion controller not shown different from the controller 14. The indicator 92 is made up of four LEDs, for example, and shows identification information (controller number) of the controller 14 by lighting any one of the four LEDs and depending on the lighted LED, and the indicator 92 shows the remaining amount of power of the controller 14 depending on the number of LEDs to be lit up.

In addition, the controller 14 has an imaged information arithmetic section 108 (see FIG. 4), and as shown in FIG. 3(B), light incident opening 94 of the imaged information arithmetic section 108 is provided on the front end surface of the housing 70. Furthermore, the controller 14 has a speaker 114 (see FIG. 4), and the speaker 114 is provided inside the housing 70 at the position corresponding to a sound release hole 96 between the 1 button 74 and the HOME button 82 on the tope surface of the housing 70 as shown in FIG. 3(A).

Note that as shown in FIG. 3(A) to FIG. 3(B), the shape of the controller 14 and the shape, number and setting position of each input means 36 are simply examples, and they may be modified as necessary.

Figure 4:
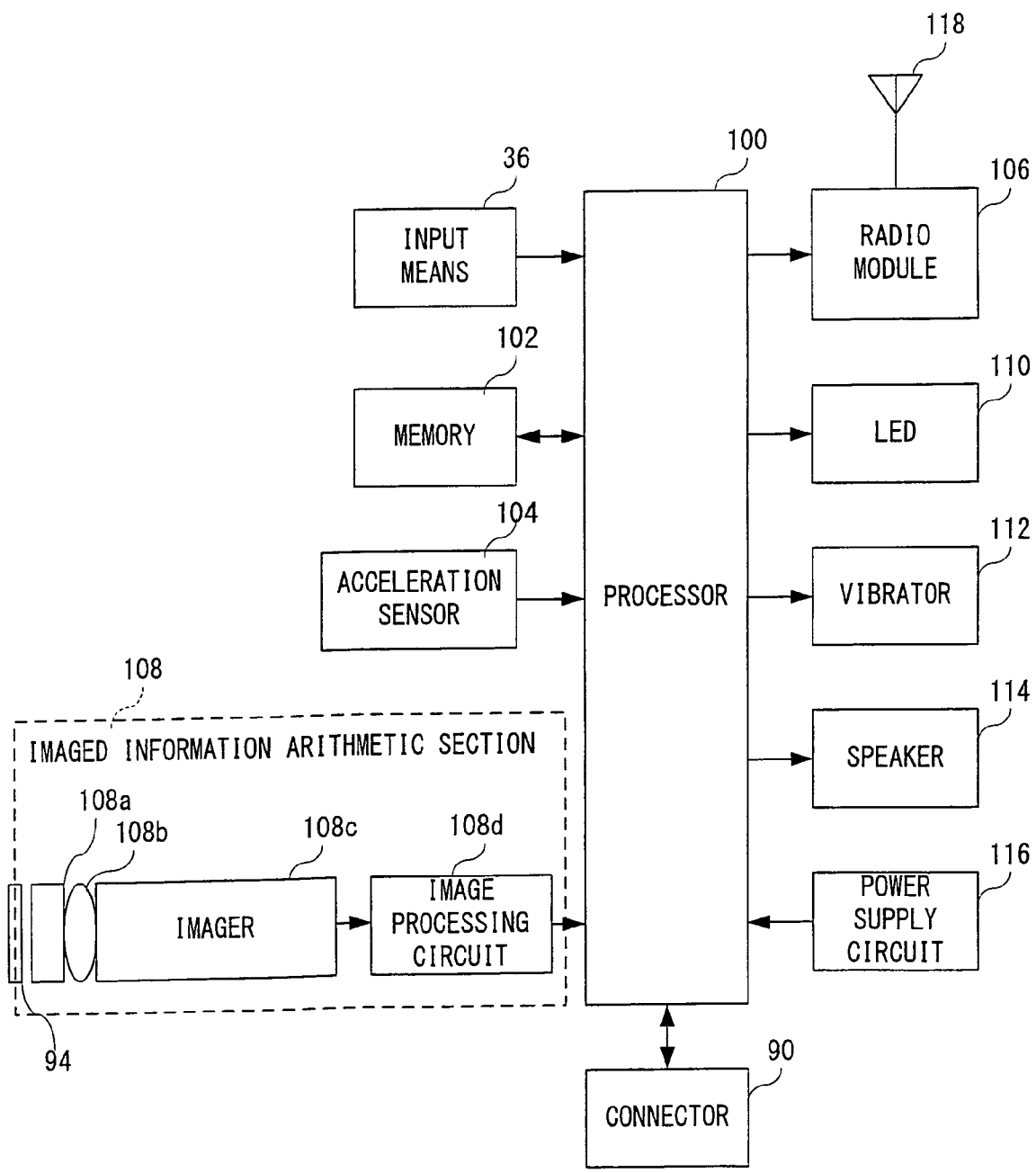
FIG. 4 is a block diagram showing one example of an electric configuration of the controller.

FIG. 4 is a block diagram showing an electric configuration of the controller 14. Referring to FIG. 4, the controller 14 includes a processor 100, and the processor 100 is connected with the external expansion connector 90, the input means 36, a memory 102, an acceleration sensor 104, a radio module 106, the imaged information arithmetic section 108, an LED 110 (the indicator 92), an vibrator 112, a speaker 114, and a power supply circuit 116 by an internal bus (not shown). Moreover, an antenna 118 is connected to the radio module 106.

It should be noted that although omitted in FIG. 4, the indicator 92 is made up of four LEDs 110 as described above.

The processor 100 is in charge of an overall control of the controller 14, and transmits (inputs) information (input information) inputted by the input means 36, the acceleration sensor 104, and the imaged information arithmetic section 108 as input data to the game apparatus 12 via the radio module 106 and the antenna 118. At this time, the processor 100 uses the memory 102 as a working area or a buffer area. An operation signal (operation data) from the aforementioned input means 36 (72-84) is input to the processor 100, and the processor 100 stores the operation data once in the memory 102.

Figure 3:
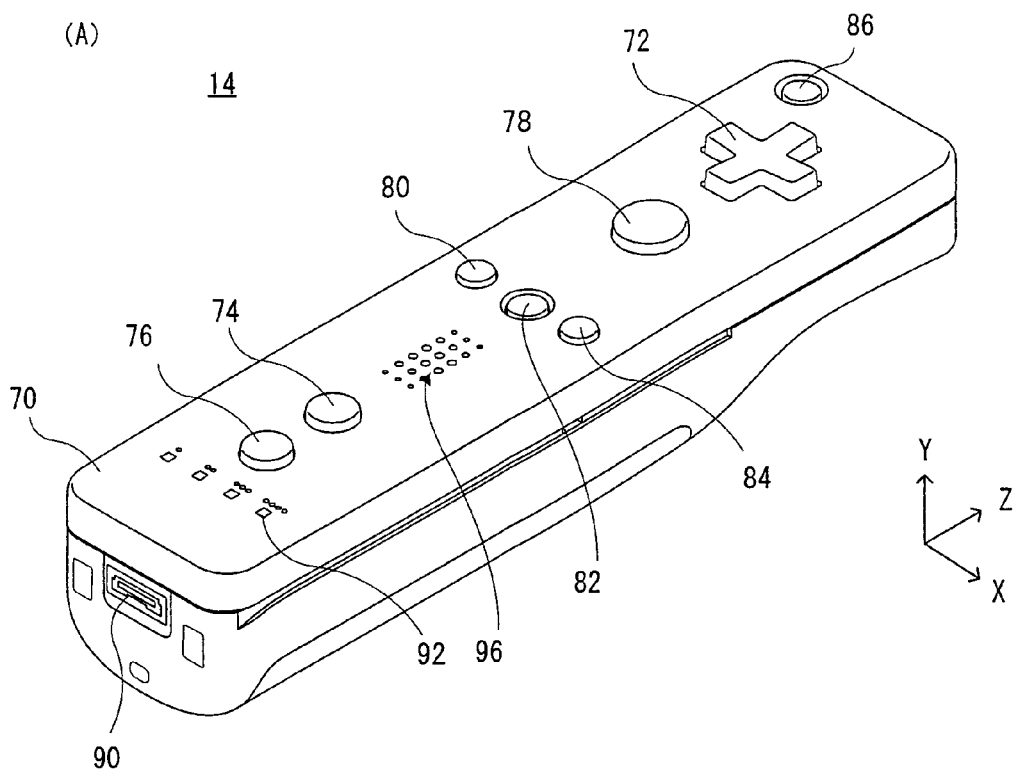
FIG. 3 is an illustrative view showing one example of an appearance of a controller utilized in this embodiment.
Figure 3:
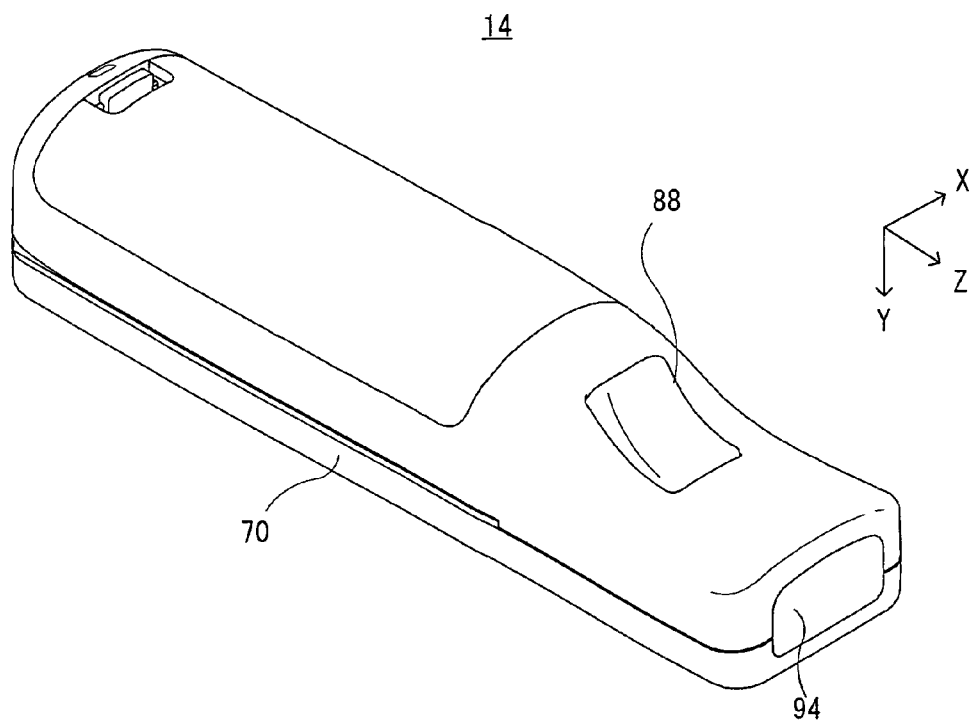

Moreover, as shown in FIG. 3 the acceleration sensor 104 detects each acceleration of the controller 14 in directions of three axes of vertical direction (y-axial direction), lateral direction (x-axial direction), and forward and rearward directions (z-axial direction). The acceleration sensor 104 is typically an acceleration sensor of an electrostatic capacity type, but the acceleration sensor of other type may also be used.

For example, the acceleration sensor 104 detects the accelerations (ax, ay, az) in each direction of x-axis, y-axis, z-axis for each first predetermined time, and inputs the data of the acceleration (acceleration data) thus detected to the processor 100. For example, the acceleration sensor 104 detects the acceleration in each direction of the axes in a range from −2.0 G to 2.0 G (G indicates a gravitational acceleration. The same thing can be the hereafter.) The processor 100 detects the acceleration data given from the acceleration sensor 104 for each second predetermined time, and stores it in the memory 102 once.

The processor 100 creates input data including at least one of the operation data, acceleration data and marker coordinate data as described later, and transmits the input data thus created to the game apparatus 12 for each third predetermined time (5 msec, for example).

In this embodiment, although omitted in FIG. 3, the acceleration sensor 104 is provided inside the housing 70 and in the vicinity on the circuit board where the cross key 72 is arranged.

It will be appreciated by those skilled in the art from the description of this specification that a computer, such as a processor (CPU 40, for example) of the game apparatus 12 or the processor (processor 100, for example) of the controller 14 executes processing on the basis of an acceleration signal output from the acceleration sensors 104, and whereby, more information relating to the controller 14 can be estimated or calculated (determined).

The controller is incorporated with the single axis acceleration sensor 104, for example, and in a case that processing is executed on the side of the computer assuming that the controller 14 is in a static state, that is, processing is executed considering that accelerations detected by the acceleration sensor 104 is only gravitational accelerations, if the controller 14 is actually in a static state, it is possible to know whether or not the orientations of the controller 14 is inclined with respect to the direction of gravity or to what extent they are inclined on the basis of the detected acceleration. More specifically, when a state in which the detection axis of the acceleration sensor 104 is directed to a vertically downward direction is taken as a reference, merely whether or not 1 G (gravitational acceleration) is imposed on can show whether or not the controller 14 is inclined, and the size can show to what extent it is inclined.

Furthermore, if a multi-axes acceleration sensor 104 is mounted on the controller 14, by further performing processing on an acceleration signal of each axis, it is possible to more precisely know to what extent the controller 14 is inclined with respect to the direction of gravity. In this case, on the basis of outputs from the acceleration sensor 104, the processor 100 may perform processing of calculating data of inclined angle of the controller 14, but perform processing of estimating an approximate inclination on the basis of the outputs from the acceleration sensor 104 without performing the processing of calculating the data of the inclined angle. Thus, by using the acceleration sensor 104 in conjunction with the processor 100, it is possible to determine an inclination, an orientation or a position of the controller 14.

On the other hand, assuming that the acceleration sensor 104 are in a dynamic state, accelerations according to the movement of the acceleration sensor 104 is detected in addition to the gravitational acceleration component, and therefore, if the gravitational acceleration component is removed by predetermined processing, it is possible to know a moving direction, etc. More specifically, in a case that the controller 14 being furnished with the acceleration sensor 104 is accelerated and moved by the hand of the user, acceleration data generated by the acceleration sensor 104 is processed, and whereby, it is possible to calculate various movements and/or positions of the controller 14.

Additionally, even when assuming that the acceleration sensor 104 is in a dynamic state, if an acceleration in correspondence with the movement of the acceleration sensor 104 is removed by the predetermined processing, it is possible to know the inclination with respect to the direction of gravity. In another embodiment, the acceleration sensor 104 may contain a built-in signal processing apparatus or other kinds of dedicated processing apparatuses for performing desired processing on the acceleration signal (acceleration data) output from the incorporated acceleration detecting means before outputting the acceleration signal to the processor 100. For example, in a case that the acceleration sensor 104 is one for detecting a static acceleration (gravitational acceleration, for example), the built-in or dedicated processing apparatuses may be one for transforming the detected acceleration data into the inclined angle (or other preferable parameters) corresponding thereto.

The radio module 106 modulates a carrier at a predetermined frequency by the input data, by using a technique of Bluetooth, for example, and emits its weak radio wave signal from the antenna 118. Namely, the input data is modulated to the weak radio wave signal by the radio module 106 and transmitted from the antenna 118 (controller 14). The weak radio wave signal is received by the radio controller module 52 provided to the aforementioned game apparatus 12. The weak radio wave thus received is subjected to demodulating and decoding processing. This makes it possible for the game apparatus 12 (CPU 40) to acquire the input data from the controller 14. Then, the CPU 40 performs processing of an application (game processing), following the input data and the program (game program).

In addition, as described above, the controller 14 is provided with the imaged information arithmetic section 108. The imaged information arithmetic section 108 is made up of an infrared rays filter 108a, a lens 108b, an imager 108c, and an image processing circuit 108d. The infrared rays filter 108a passes only infrared rays from the light incident from the front of the controller 14. As described above, the markers 32a and 32b placed near (around) the display screen of the monitor 28 are infrared LEDs for outputting infrared lights forward the monitor 28. Accordingly, by providing the infrared rays filter 108a, it is possible to image the image of the markers 32a and 32b more accurately. The lens 108b condenses the infrared rays passing thorough the infrared rays filter 108a to emit them to the imager 108c. The imager 108c is a solid imager, such as a CMOS sensor and a CCD, for example, and images the infrared rays condensed by the lens 108b. Accordingly, the imager 108c images only the infrared rays passing through the infrared rays filter 108a to generate image data. Hereafter, the image imaged by the imager 108c is called an "imaged image". The image data generated by the imager 108c is processed by the image processing circuit 108d. The image processing circuit 108d calculates a position of an object to be imaged (markers 32a and 32b) within the imaged image, and outputs each coordinate value indicative of the position to the processor 100 as imaged data (marker coordinates data to be described later) for each fourth predetermined time. It should be noted that a description of the process in the image processing circuit 108d is made later.

Figure 5:
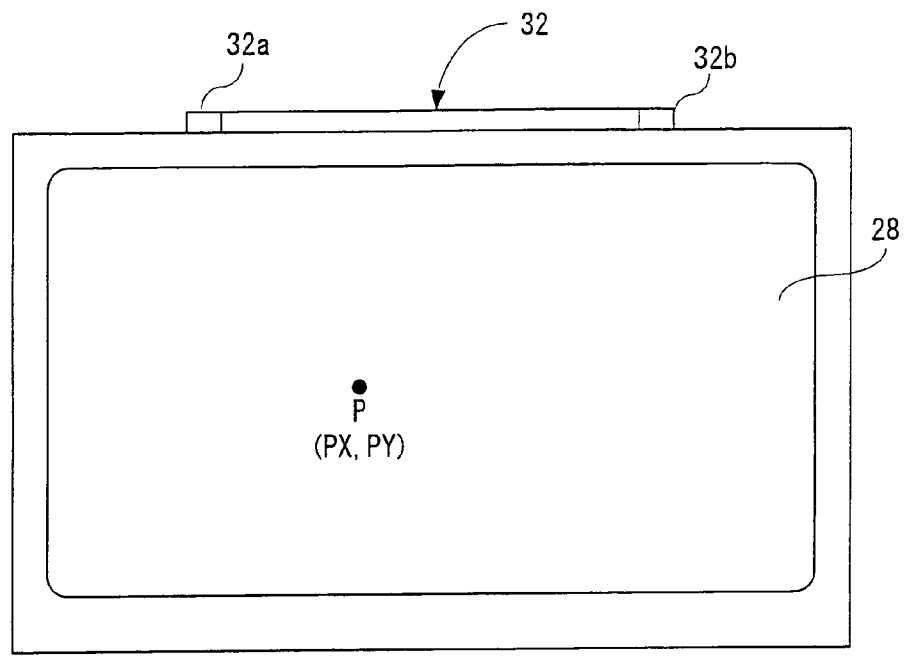
FIG. 5 is an illustrative view showing a state when a game is played by utilizing the controller in this embodiment.
Figure 5:
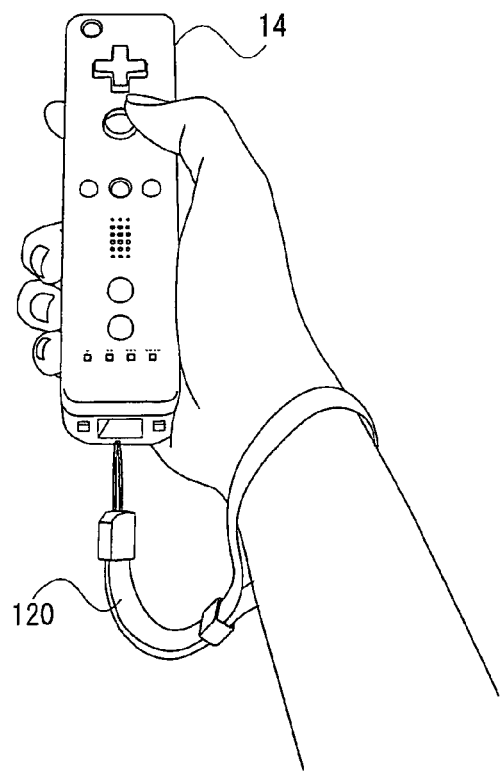

FIG. 5 is an illustrative view summarizing a state when a player plays a game by utilizing a controller 14. As shown in FIG. 5, when playing the game by means of the controller 14 in the video game system 10, the player holds the controller 14 with the palm of one hand in a state that a strap 120 tied at one end of the controller 14 is wound around the wrist of the same hand. Strictly speaking, the player holds the controller 14 in a state that the front end surface (the side of the incident light opening 94 of the light imaged by the imaged information arithmetic section 108 shown in FIG. 3) of the controller 14 is oriented to the markers 32a and 32b. It should be noted that the markers 32a and 32b are placed in parallel with the horizontal direction of the screen of the monitor 28 as illustrated. In this state, the player performs a game operation by changing a position on the screen indicated by the controller 14 and changing a distance between the controller 14 and each of the markers 32a and 32b.

Figure 6:
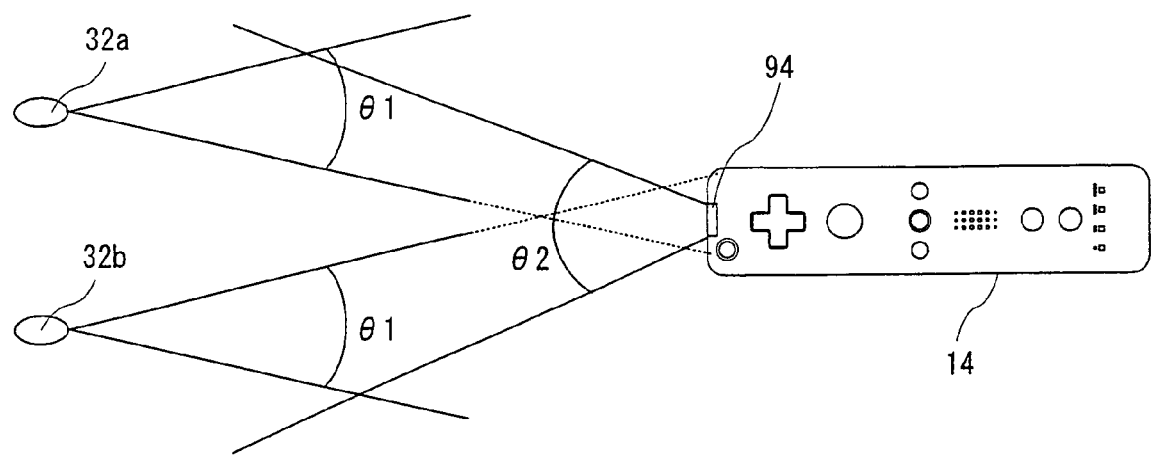
FIG. 6 is an illustrative view showing viewing angles of markers and the controller in this embodiment.

FIG. 6 is a view showing viewing angles between the respective markers 32a and 32b, and the controller 14. As shown in FIG. 6, each of the markers 32a and 32b emits infrared ray within a range of a viewing angle θ1. Also, the imager 108c of the imaged information arithmetic section 108 can receive incident light within the range of the viewing angle θ2 taking the line of sight of the controller 14 as a center. For example, the viewing angle θ1 of each of the markers 32a and 32b is 34° (half-value angle) while the viewing angle θ2 of the imager 108c is 41°. The player holds the controller 14 such that the imager 108c is directed and positioned so as to receive the infrared rays from the markers 32a and 32b. More specifically, the player holds the controller 14 such that at least one of the markers 32a and 32b exists in the viewing angle θ2 of the imager 108c, and the controller 14 exists in at least one of the viewing angles θ1 of the marker 32a or 32b. In this state, the controller 14 can detect at least one of the markers 32a and 32b. The player can perform a game operation by changing the position and the orientation of the controller 14 in the range satisfying the state.

If the position and the orientation of the controller 14 are out of the range, the game operation based on the position and the orientation of the controller 14 cannot be performed. Hereafter, the above-described range is called an "operable range."

Figure 7:
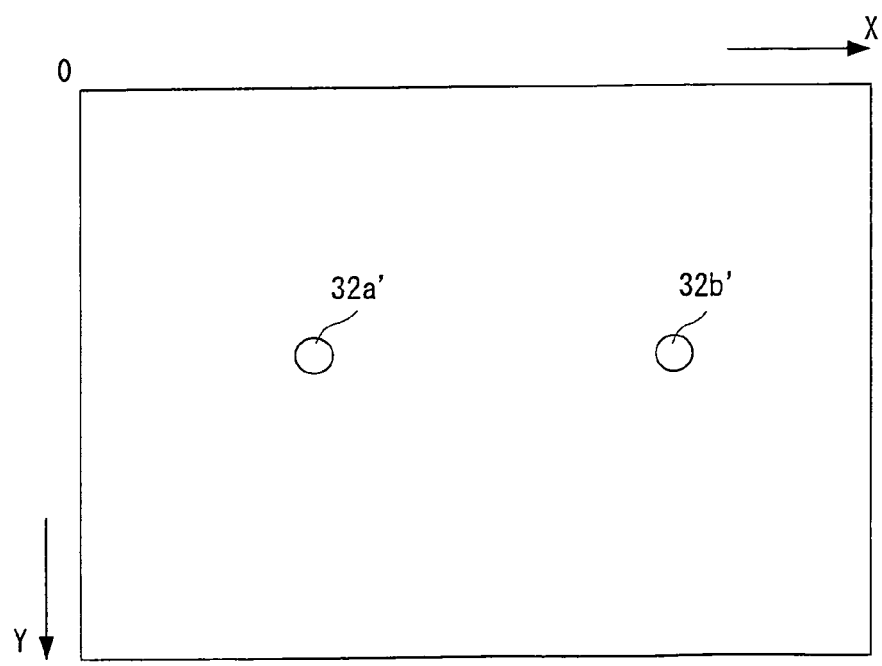
FIG. 7 is an illustrative view showing one example of imaged images including an object image.

If the controller 14 is held within the operable range, an image of each of the markers 32a and 32b is imaged by the imaged information arithmetic section 108. That is, the imaged image obtained by the imager 108c includes an image (object image) of each of the markers 32a and 32b as an object to be imaged. FIG. 7 is a view showing one example of the imaged image including an object image. The image processing circuit 108d calculates coordinates (marker coordinates) indicative of the position of each of the markers 32a and 32b in the imaged image by utilizing the image data of the imaged image including the object image.

Since the object image appears as a high-intensity part in the image data of the imaged image, the image processing circuit 108d first detects the high-intensity part as a candidate of the object image. Next, the image processing circuit 108d determines whether or not the high-intensity part is an object image on the basis of the size of the detected high-intensity part. The imaged image may include images other than the object image due to sunlight through a window and light of a fluorescent lamp in the room as well as the images 32a' and 32b' corresponding to the two markers 32a and 32b as an object image. The determination processing whether or not the high-intensity part is an object image is executed for discriminating the images 32a' and 32b' of the two markers 32a and 32b as an object image from the images other than them, and accurately detecting the object image. More specifically, in the determination process, it is determined whether or not the detected high-intensity part is within the size of the preset predetermined range. Then, if the high-intensity part is within the size of the predetermined range, it is determined that the high-intensity part represents the object image. On the contrary, if the high-intensity part is not within the size of the predetermined range, it is determined that the high-intensity part represents the images other than the object image.

In addition, as to the high-intensity part which is determined to represent the object image as a result of the above-described determination processing, the image processing circuit 108d calculates the position of the high-intensity part. More specifically, the barycenter position of the high-intensity part is calculated. Here, the coordinates of the barycenter position is called a "marker coordinate". Also, the barycenter position can be calculated with more detailed scale than the resolution of the imager 108c. Now, the resolution of the imaged image imaged by the imager 108c shall be 126×96, and the barycenter position shall be calculated with the scale of 1024×768. That is, the marker coordinate is represented by the integer from (0, 0) to (1024, 768).

Additionally, the position in the imaged image shall be represented by a coordinate system (XY coordinate system) taking the upper left of the imaged image as an origin point, the downward direction as an Y-axis positive direction, and the right direction as an X-axis positive direction.

Also, if the object image is properly detected, two high-intensity parts are determined as object images by the determination process, and therefore, two marker coordinates are calculated. The image processing circuit 108d outputs data indicative of the calculated two marker coordinates. The data (marker coordinate data) of the output marker coordinates is included in the input data by the processor 100 as described above, and transmitted to the game apparatus 12.

The game apparatus 12 (CPU 40) detects the marker coordinate data from the received input data to thereby calculate an instructed position P (instructed coordinate PX, PY) by the controller 14 on the screen of the monitor 34 and a distances from the controller 14 to each of the markers 32a and 32b on the basis of the marker coordinate data. More specifically, from the position of the mid point of the two marker coordinates, a position to which the controller 14 faces, that is, an instructed position is calculated. The distance between the object images in the imaged image is changed depending on the distance between the controller 14 and each of the markers 32a and 32b, and therefore, the game apparatus 12 can grasp the distance between the controller 14 and each of the markers 32a and 32b by calculating the distance between the two marker coordinates.

Figure 8:
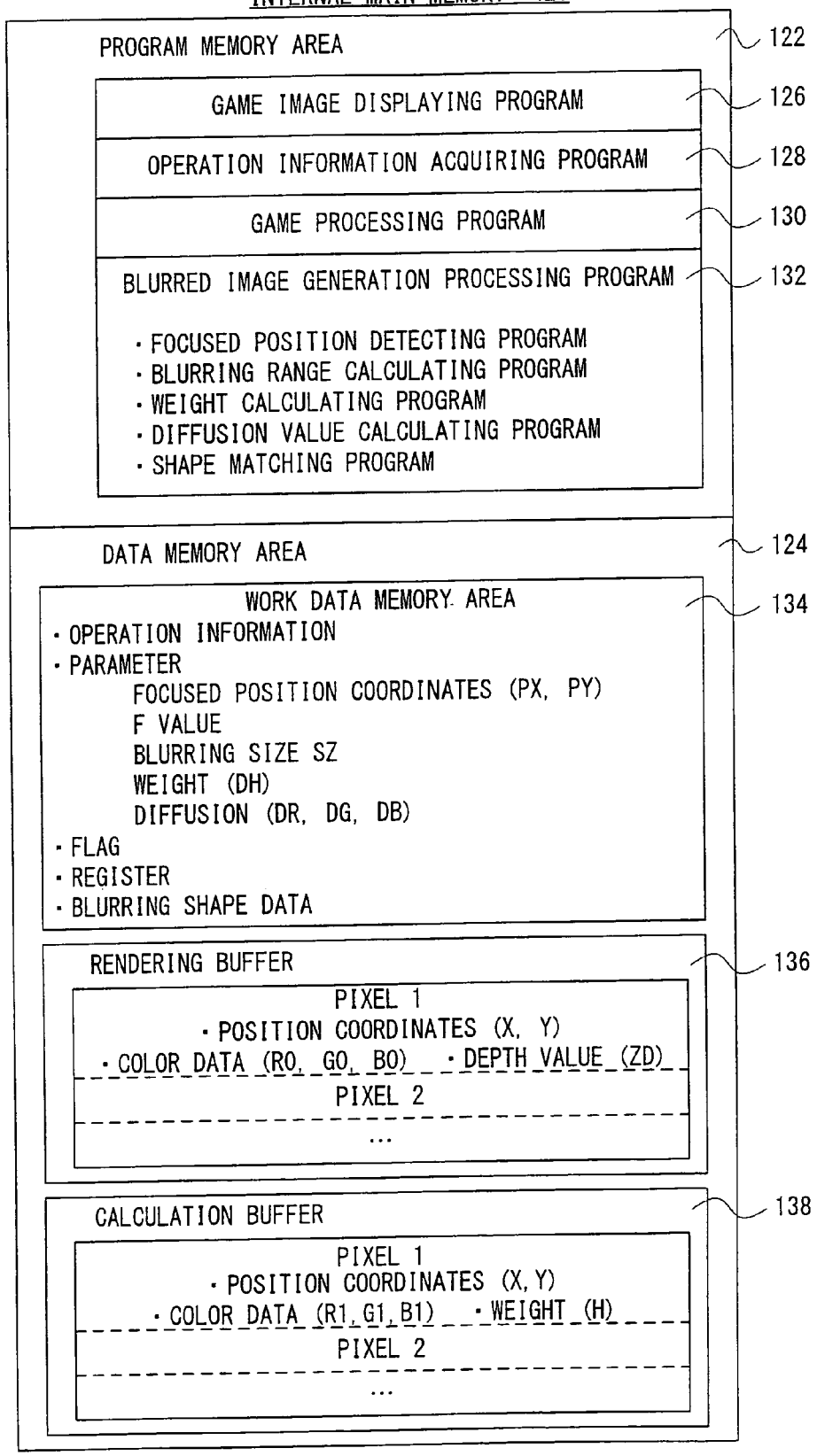
FIG. 8 is an illustrative view showing one example of a memory map.

One example of a memory map when a game and game processing therefor as one example are executed in the game system 10 of this embodiment described in FIG. 1-FIG. 7 is shown in FIG. 8. The main memory 42e includes a program memory area 122 and a data memory area 124. A part of the program and data are read from the optical disk 22 entirely at a time, or partially and sequentially as necessary so as to be stored into the main memory 48, and executed in the CPU 40, and the GPU 42b and the DSP 42c within the system LSI 42 shown in FIG. 2. It should be noted that FIG. 8 shows only a part of the memory map, and stores other programs and data required for the processing.

In the program memory area 122, a memory area 126 stores a game image displaying program for displaying a game image by the game program in this embodiment. A memory area 128 stores an operation information acquiring program for acquiring operation information including an operation signal by the input means 36 of the controller 14 and marker coordinate data when the controller 14 is moved, acceleration data, etc. By the program, the CPU 40 acquires operation information (referred to be as "controller data") from the controller 14. As described above, controller data from the controller 14 is regularly received via the Bluetooth communication unit 74. The received controller data is stored in a work data memory area 136 of the data memory area 124. The controller data includes, as described above, input data of the controller 14. Accordingly, the controller data includes data indicating acceleration detected by the acceleration sensor 104 of the controller 14. By the operation information acquiring program, acceleration data of the controller 14 from the controller data is fetched for each frame. It should be noted that as described above, since acceleration of each axis is detected at a sampling interval (1/200 seconds, for example) shorter than 1 frame (1/60 seconds, for example) of the game apparatus 12 by the acceleration sensor 104, controller data includes a plurality of acceleration values for each axis. Thus, by extracting an adequate value such as an average value, a maximum value, a minimum value, etc., acceleration of each axis at a current frame is acquired. The acquired acceleration of each axis of the controller 14 is also stored in the work data memory area 134.

A memory area 130 stores a program (game processing program) except for an image displaying program required for the game processing.

A memory area 132 stores a blurred image generation processing program as a feature of this embodiment. In the game of this embodiment, when a "photographing operation" is performed by utilizing the above-described controller 14, image processing such as clipping a game image (virtual three-dimensional image, for example) as a still image (photograph) is executed. The "blurred image generation processing" means image processing in which at a time of clipping the still image, like a real photograph, an image of places, objects which are in focus is imaged clearly, but around the focused position, "out of focus", the image is represented like an obscure image (this is called as "blurred image"). More specifically, the program is executed according to a flowchart shown in FIG. 10.

When each program component included in the blurred image generating program is briefly explained, a focused position detecting program is a program for specifying a focused position P (PX, PY) when the user makes a photographing operation by the controller 14. A blurring range calculating program is a program for calculating for each pixel a range ("blurring range" or "blurring size": "SZ" described later) to generate a blurred image.

A weight calculating program is a program for calculating a coefficient required for calculating a diffusion value (described later) for each color required for the blur processing. In this embodiment, a concept of so-called "color vector" is used in which each color component R, G, and B is taken as a vector, and an intensity of light is represented by a magnitude of the vector, and by the magnitude of the color vector, a diffusion value of each color is decided. Then, a coefficient indicating the magnitude of the color vector is "weight".

The diffusion value is a value indicating a degree of diffusion of each color for each pixel, and the larger the diffusion value is, the higher the degree of the blur is.

A shape matching program is a program for deciding a blurring objective pixel by matching a blurring shape and the above-described blurring range. Here, the "blurring shape" is a shape of defining an outline of the blurred image, and is relatively simple arbitrary shape such as a polygon like a rectangle, a triangle, a circle, a rhombus, and a star shape. In this embodiment, a hexagon is assumed as described below.

However, even if the outline such as the "blurring shape" is not especially defined, the blurred image generating processing can be executed, and therefore, the "blurring shape" and the matching program for matching it with the blurring range (SZ) are not sometimes required.

A memory area 134 of the data memory area 124 is a working area for temporarily storing working data such as controller data, a flag, a register, a calculation result, a parameter, etc. as discussed above. As the parameter data, there are a focused position P (PX, PY) detected in the above-described focused position detecting program, a F value, a blurring range (SZ) calculated in the above-described blurring range calculating program, a weight (H) calculated in the weight calculating program, a diffusion value, etc. It should be noted that the F value is, as well known, a "F number" or "F-stop" represented by f value (focal length)/d (effective aperture of a lens) for representing the brightness of the lens. Here, the f value indicates a range of a focal length, and the longer the focal length is, the shallower the depth of field is, and the nearer the focused range is. Thus the background of the subject is blurred to produce an enhanced subject. Then, the larger the F value is, the deeper the depth of field is. For example, when the F value is "2.8", the depth of field becomes shallow, and when the F value is "4.0", the depth of field becomes deep.

Additionally, the work data memory area 134 may temporarily store data of the above-described "blurring shape", such as hexagonal data, for example.

A memory area 136 is a rendering buffer for storing position coordinates (X, Y), color data (R, G, B) and depth values (Z value) (ZD) as to all the pixels (dots) (640×456 dots, for example) to form a game image on the screen of the monitor 28. Furthermore, the color data in the rendering buffer 136 is a default value, and in the blurred image generating processing, the color data is modified to generate pixel data for display (output) including a blurred image.

A memory area 138 is a calculation buffer for storing position coordinates (X,Y), color data (R, G, B) and weights (H) as to all the pixels (dots) that actually form a game image on the screen of the monitor 28.

Figure 9:
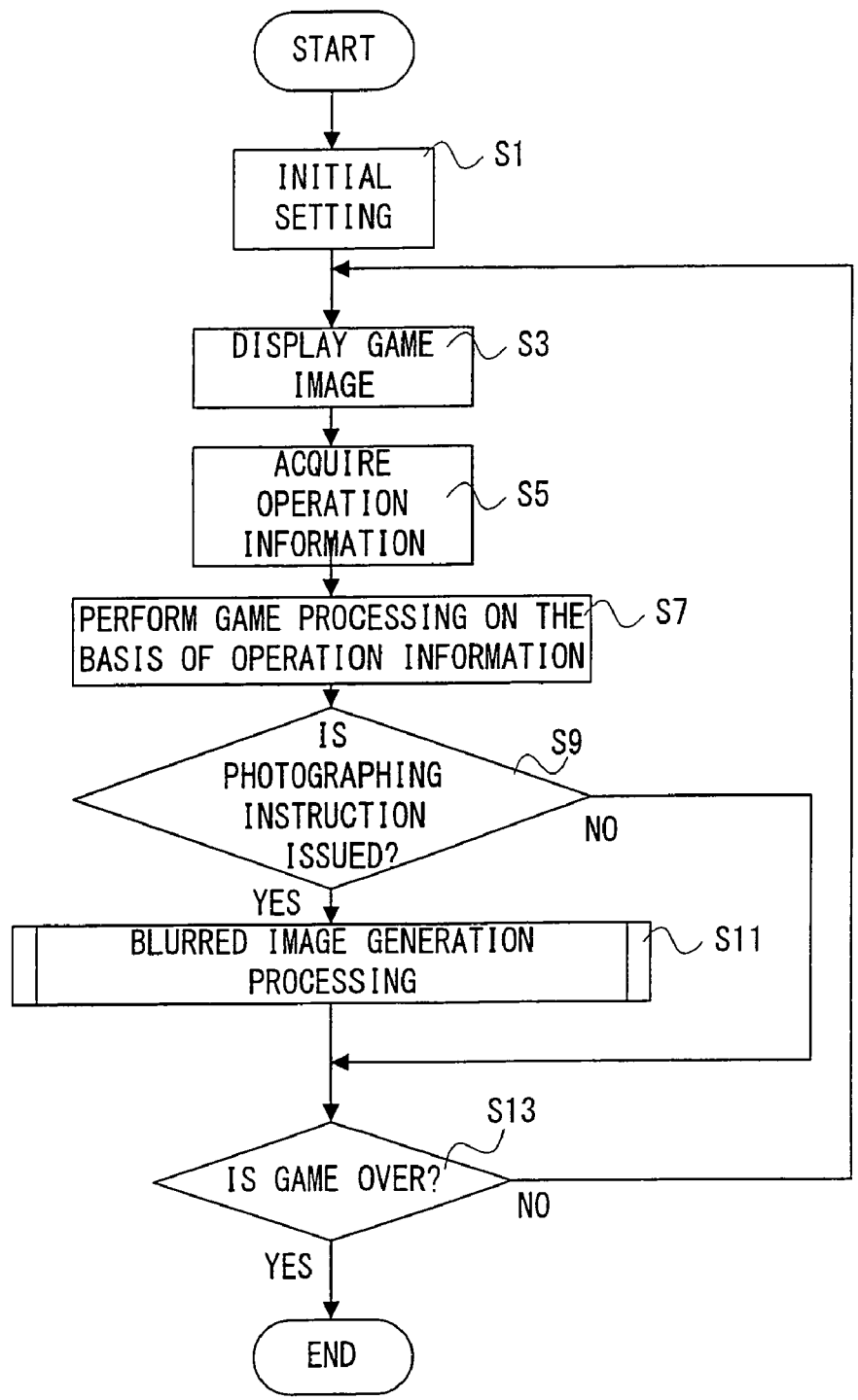
FIG. 9 is a flowchart showing one example of a game operation of a CPU of the game apparatus.

Referring to the flowchart shown in FIG. 9, one example of a game operation of this embodiment is explained. The processing in steps S1 to S13 in FIG. 9 is executed per unit of time (1 frame). When the processing is started, in the step S1, the CPU 40 executes an initial setting operation, and sets necessary data to the work data memory area 134 and the rendering buffer 136 of the data memory area 124 shown in FIG. 8 by reading the same from the program memory area 122, and so forth.

In the step S3, by reading the area 126 shown in FIG. 8 and executing the developed game image displaying program, the CPU 40 displays, on the screen of the monitor 28, a game image according to color data (R0, G0, B0) and a depth value (ZD) of each pixel read from the rendering buffer 136. More specifically, the default color data (R0, G0, B0) and the default depth value (ZD) in the rendering buffer 136 are computed to write color data for display (R1, G1, B1) and a weight (H) of each pixel to the calculation buffer 138, the data in the calculation buffer 138 is output to the AVIC 56 (FIG. 2), and whereby, a virtual three-dimensional game image is displayed.

In the succeeding step S5, the CPU 40 receives data from the input-output processor 42a (FIG. 2) to acquire operation information of the controller 14 operated by a user or a player. The operation information includes an operation signal of each of the operation buttons and each of the operating switches of the input means 36, marker coordinate data, acceleration data, etc. I the step S7, on the basis of the operation information thus acquired, game processing such as processing of moving a player character, of causing the player character to perform a specific action is executed similar to the game apparatus that is well known as "Wii" (registered trademark), for example. Although the specific game processing itself in the step S7 is not an essential point of the invention, a detailed description is omitted here.

In the next step S9, the computer or the CPU 40 determines whether or not a photographing instruction is issued by detecting the presence or absence of information of an imaging operation included in the operation information acquired in the step S5. In the embodiment, as shown in FIG. 5, for example, when a photoreceptor unit being the end of the controller 14 is directed within the screen of the monitor 28, and the A button 78 (FIG. 3) is operated, it is determined that the user or the player inputs a photographing instruction.

Figure 11:
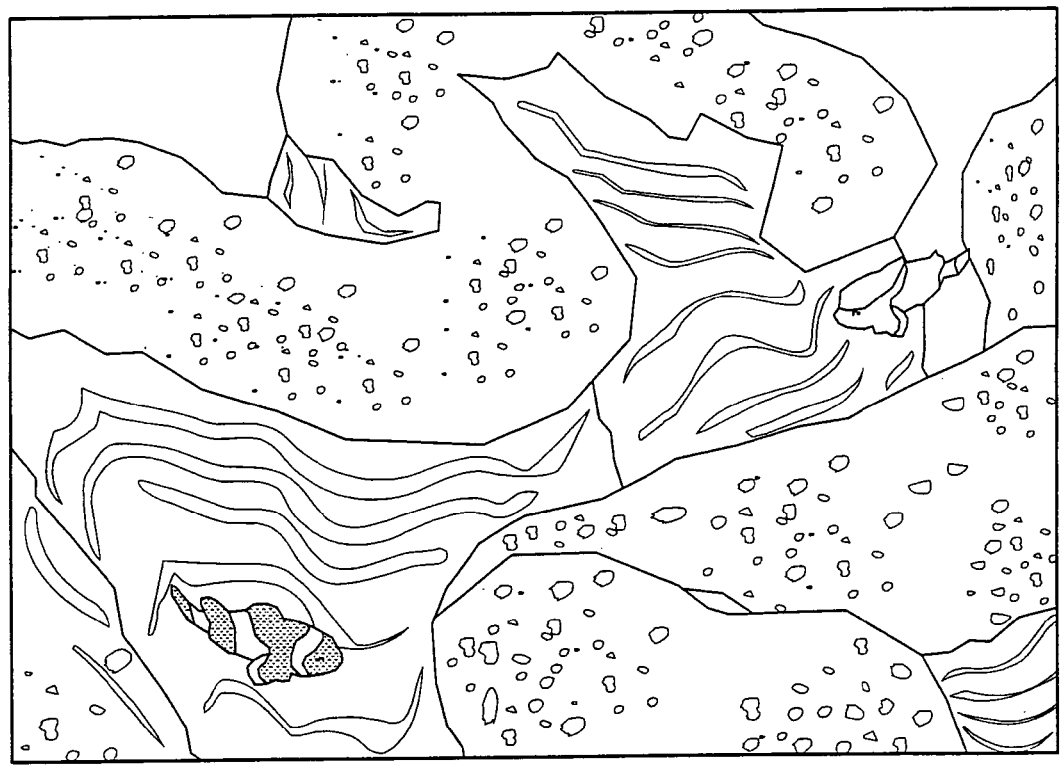
FIG. 11 is an illustrative view showing an original still image (imaged image) on which blur processing is not performed.

Here, "photographing" means processing or an operation of clipping a game image being a virtual three-dimensional image as a still image at a "photographing" timing as described above. This corresponds to a photographing operation, and thus called "photographing". One example of a photograph or a still image on which no blur processing is performed is shown in FIG. 11. Clipping a three-dimensional image like a photograph is called "photographing" but FIG. 11 is an original photograph on which no blur processing is performed, so that everything (all the objects) are represented so as to be into focus.

This embodiment is directed to represent a natural perspective like a general camera by performing blur processing on the image which falls out of focus depending on the position of a pint of focus in a depth direction in such a "photograph".

Figure 10:
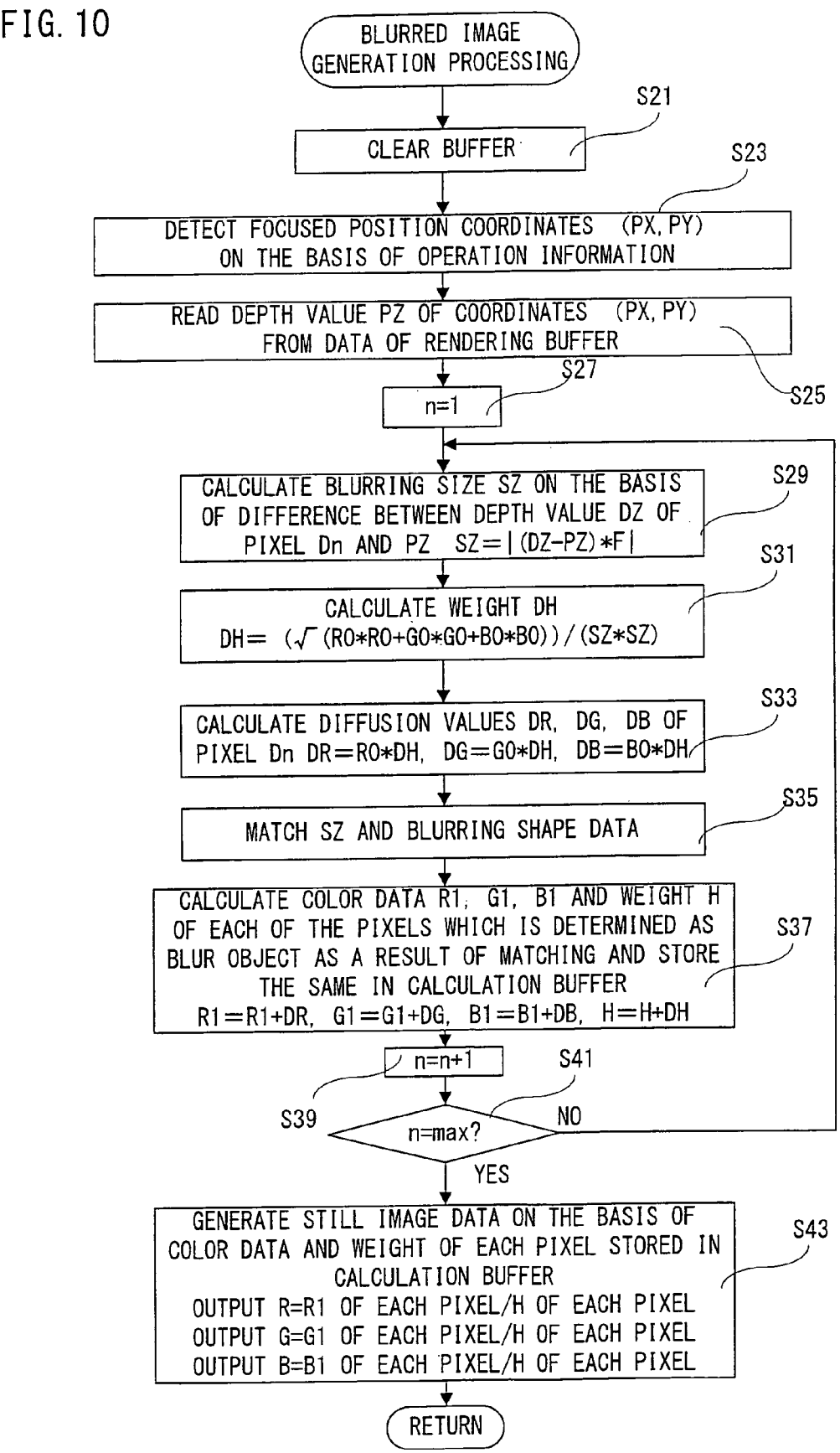
FIG. 10 is a flowchart showing one example of an operation of blurred image generating processing shown in FIG. 9.

The "blur processing" is executed in the step S11, and the processing in the step S11 is shown in detail in FIG. 10.

Additionally, in the step S13, the CPU 40 determines whether or not the user instructs a game end on the basis of the operation information acquired in the step S5, or whether or not a game end is required in the step S7, and if "NO", the process returns to the preceding step S3 to repeatedly execute the steps from the steps S3 to S13 while if "YES", end processing is directly executed.

In a step S21 in FIG. 10, the computer, that is, the CPU 40 clears the calculation buffer 138 (FIG. 8) to execute following processing.

In a succeeding step S23, the CPU 40 detects the position coordinates (PX, PY) of the focused position P shown in FIG. 5 when the A button 78 is operated on the basis of the operation information (instructed position on the screen calculated on the basis of the marker coordinate data, etc. or position to which the end of the controller 14 is directed) fetched in the step S5 (FIG. 9). The detection of the instruction position is explained above with reference to FIG. 6 and FIG. 7, and thus not repeated here.

Succeedingly, in a step S25, the CPU 40 detects a depth value PZ at the focused position P from the rendering data read from the rendering buffer 136.

Then, in a step S27, the number of pixels n is set to one, and the processing in the steps S29-S41 is repeatedly executed until processing as to all the pixels is detected in the step S41.

In a step S29, a range on which blur processing has to be performed, that is, a size SZ of the blur is calculated according to a following equation (1) on the basis of the difference between a depth value DZ of the n-th pixel Dn and the depth value PZ at the focused position acquired in the step S25.

$$SZ = |(DZ - PZ) \times F| \tag{1}$$

However, F is the above-described F value (F number).

Figure 12:
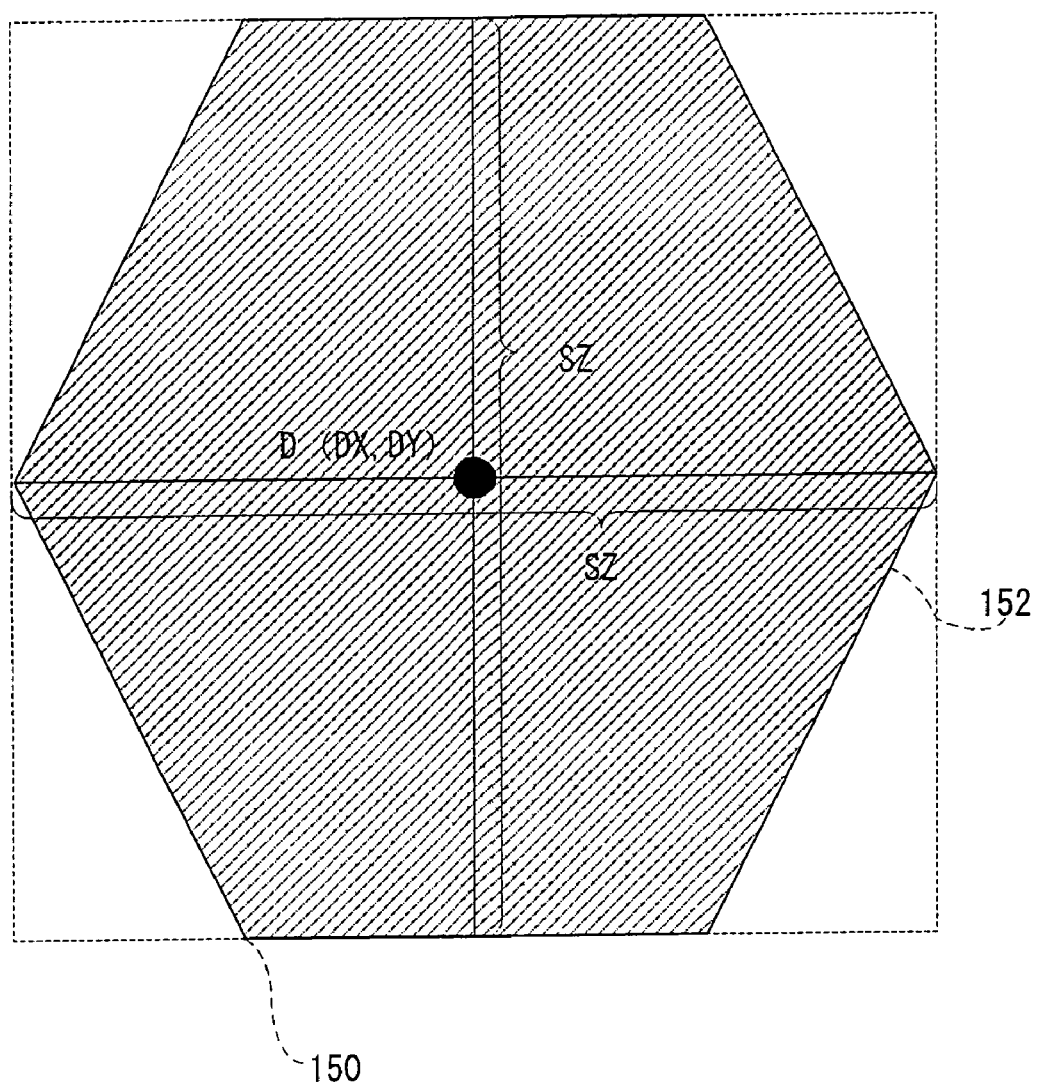
FIG. 12 is an illustrative view showing a state that a blurring range (size of the blur) and a blurring shape.

The blurring range is a square area 150 having a size of SZ long and SZ wide taking a pixel D (DX, DY) being an object at that time as a center as shown in FIG. 12.

In a succeeding step S31, the CPU 40 calculates a weight DH of the pixel Dn according to a following equation (2). As described above, the "weight" is a value relative to the strength of the light of the pixel, and is a magnitude when the strength of the light is represented by the vector. The weight DH is thus proportion to the strength of the light, and in inverse proportion to the blurring range (area), that is, the size SZ of the afore-stated blur.

$$DH = \frac{\sqrt{R0 \times R0 + G0 \times G0 + B0 \times B0}}{SZ \times SZ} \tag{2}$$

In a next step S33, a diffusion value DR, DG, DB as to each of the colors of the pixel Dn is calculated according to a following equation (3). It should be noted that the diffusion value is a coefficient representing a degree of the blur, and is a correlation value of the size SZ of the above-described blur. The central position D (DX, DY) shown in FIG. 12 is the pixel Dn as an object in the step S33, and it is considered that the diffusion value is an index indicating to what extent the blur exerts an effect from the central position, that is, the pixel as an object.

$$DR = R0 \times DH$$

$$DG = G0 \times DH$$

$$DB = B0 \times DH \tag{3}$$

In a succeeding step S35, the CPU 40 matches the size SZ of the blurring range with the blurring shape. In the embodiment shown in FIG. 12, a hexagonal blurring shape 152 is assumed with respect to the blurring range 150, and the pixels of the area where the blurring range 150 and the blurring shape 152 are overlapped (indicated by cross-hatching in FIG. 12) become blurring objective pixels or pixels to be blurred.

Then, as to each of all the blurring objective pixels or the pixels to be blurred, each of the color data R1, G1, and B1 and the weight data H is calculated according to a following equation (4), and it is written as color data and weight data of the relevant pixel to an area of the pixel of the calculation buffer 138 in a step S37.

$$R1=R1+DR$$

$$G1=G1+DG$$

$$B1=B1+DB$$

$$H=H+DH \quad (4)$$

Then, in a step S39, the pixel number is updated to repeat the above-described calculation until the last pixel (n=max), and attribute data (color data, weight data) which should actually be rendered in each of all the pixels on the screen of the monitor 28, that is, the respective pixels of the rendering buffer 136 is written in the calculation buffer 138. That is, for each of all the pixels, dispersed color data with weight and the weight data by which the color data is multiplied are accumulated.

Then, in a next step S43, the CPU 40 calculates output color data (display image data) on the basis of color data and weight data of each pixel stored in the calculation buffer 138 according to a following equation (5), and outputs the same to the AVIC 56. Thus, a natural still image, that is, a display image on which blur processing is performed according to the display image photographing instruction is displayed on the monitor 28. Thus, according to the equation (5), by dividing the accumulated colors by the accumulated weights, correct color information (color data) is output.

Output $R=R1$ at the same coordinates in the calculation buffer/$H$ at the same coordinates in the calculation buffer Output $G=G1$ at the same coordinates in the calculation buffer/$H$ at the same coordinates in the calculation buffer Output $B=B1$ at the same coordinates in the calculation buffer/$H$ at the same coordinates in the calculation buffer  (5)

Figure 13:
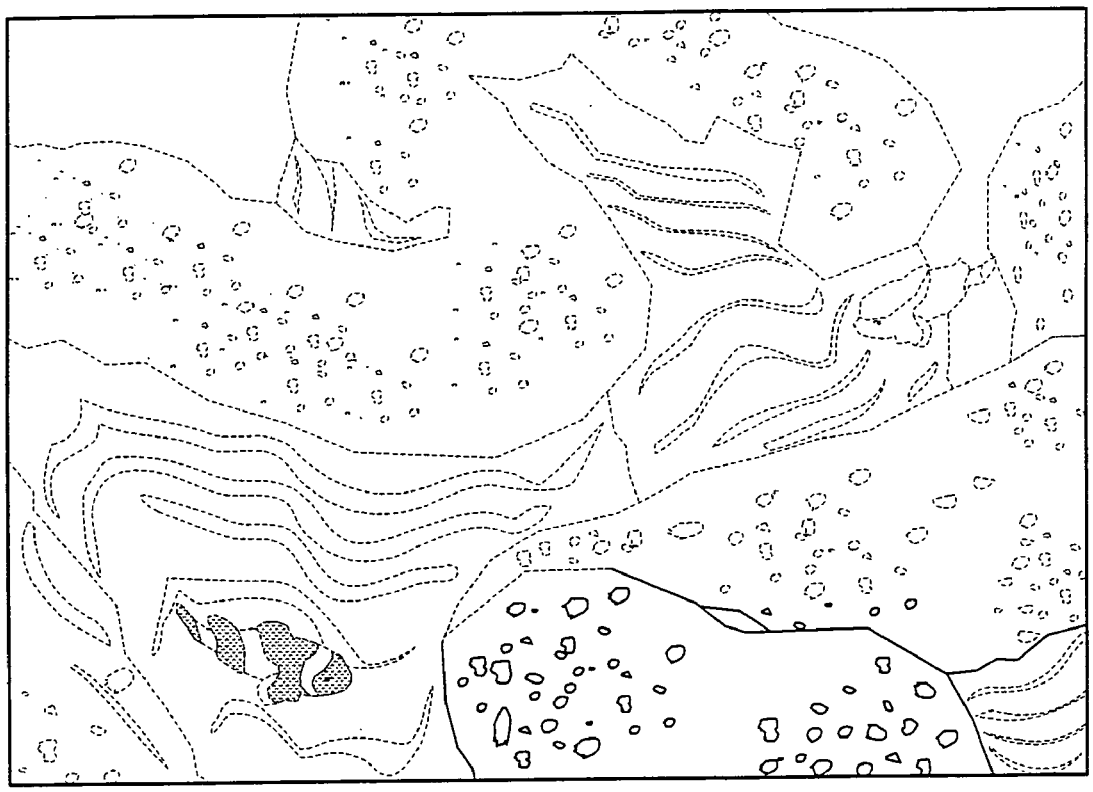
FIG. 13 is an illustrative view showing an image when a near side is brought into focus in the still image (imaged image) in FIG. 12.
Figure 14:
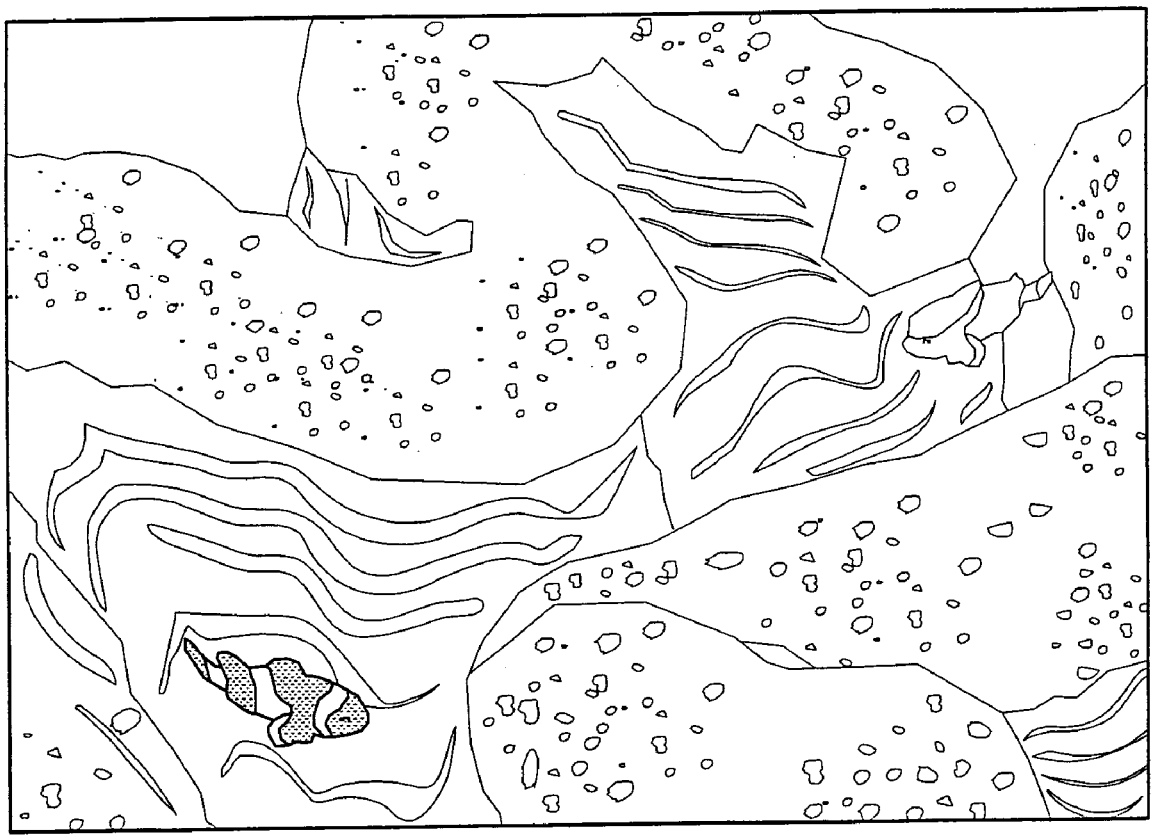
FIG. 14 is an illustrative view showing an image when a fish is brought into focus in the still image (imaged image) in FIG. 12.

Thus, the imaged image on which no blur processing is performed as shown in FIG. 11 is changed into the imaged image on which the blur processing is performed as shown in FIG. 13 or FIG. 14, for example. FIG. 13 example is an image in which a forward rock is into focus, and things except for this like fish (clownfish), etc. at the back of the rock are subjected to blur processing. FIG. 14 example is an image in which the fish (clownfish) is just into focus, and things around this fall out of focus.

In this embodiment, the matching processing between the blurring size SZ and the blurring shape in the step S35 is executed when a "verification flag" (not illustrated) which can be set in the work data memory area 134 shown in FIG. 8, for example, is "1". Here, the shape of the blurring range SZ may take a shape of a circle other than a square in this embodiment.

It should be noted that blurring objective pixels or pixels to be blurred need not to be decided by the overlapped range between the blurring size SZ and the blurring shape. As another example, the blurring shape as a default is subjected to similar transformation depending on a magnitude of the difference of the above-described depth values (change of the dimension of the blurring shape, change of the length in the vertical and horizontal directions at a constant ratio, etc.), and the pixels included in the range of the similar figures may be specified as blurring objective pixels. More specifically, a method is conceivable in which a difference is calculated in the same manner as the step S25, and depending on the magnitude of the difference, a blurring shape as a default read from the work data memory area 134 (FIG. 8) at that time is increased, decreased or used as it is, and the pixels existing in the blurring shape is specified as blurring objective pixels. Then, by executing the processing in the steps S33 and S37 as to only the pixels as the blurring objective pixels thus decided, color data on which the blur processing is performed may be created.

In the above-described embodiment, a still (imaged) image on which blur processing is performed is generated when a photographing operation is present in the step S9 in FIG. 9, but without limitation to the foregoing, the above-described blur processing may be performed on a game image (moving image changed in response to an operation by the player) in the step S3 in FIG. 9.

Although the present embodiment has been described and illustrated in detail, it is clearly understood that the same is by way of illustration and example only and is not to be taken by way of limitation, the spirit and scope of the present embodiment being limited only by the terms of the appended claims.

What is claimed is:

1. A non-transitory computer-readable storage medium having stored therein an image processing program executed by a computer of an image processing apparatus for displaying a virtual three-dimensional image by utilizing rendering data including color data and a depth value for each pixel, said image processing program causing said computer to execute:
   detecting for detecting a focused position,
   blurring range calculating for calculating for each pixel a difference between a depth value of the pixel and a depth value of said focused position which are included in said rendering data, and calculating a blurring range on the basis of said difference, wherein said blurring range is proportional to said difference with the proportionality factor being equal to the F-number of a lens,
   color data generating for generating color data which is subjected to a blurring processing as to blurring objective pixels specified on the basis of said blurring range, and
   display image generating for generating display image data on the basis of the color data generated by said color data generating.

2. The storage medium according to claim 1, wherein said color data generating includes blurring objective pixel specifying for specifying blurring objective pixels.

3. The storage medium according to claim 2, wherein said blurring objective pixel specifying includes matching for matching said blurring range and blurring shape data set in advance to specify the blurring objective pixels.

4. The storage medium according to claim 3, wherein said color data generating includes diffusion value calculating for calculating a diffusion value of each of the pixels included in said blurring range calculated by said blur range calculating and color data changing for changing, on the basis of said diffusion value, the color data included in said rendering data of the pixel determined as a blur object by said matching.

5. The storage medium according to claim 4, wherein said diffusion value calculating includes weight calculating for calculating a weight on the basis of an arithmetic expression which is proportional to a size of the color data of each pixel included in said rendering data and is inversely proportional to a size of said blurring range, and said diffusion value is calculated on the basis of said weight.

6. The storage medium according to claim 1, wherein said image processing program causes the computer to further execute a determining step for determining whether or not a photographing instruction is input,
said detecting step detects a focused position when it is determined by said determining step that a photographing instruction is input, and
said color data generating step includes a color data changing step for changing the color data included in said rendering data on the basis of a diffusion value with respect to said blurring objective pixels.

7. The storage medium according to claim 1, wherein said image processing program causes the computer to further execute operation information acquiring for acquiring operation information by a user, wherein
said detecting specifies a pixel designated on the basis of said operation information, and detects a depth value of said pixel as said focused position.

8. A non-transitory computer-readable storage medium having stored therein an image processing program executed by a computer of an image processing apparatus for displaying a virtual three-dimensional image by utilizing rendering data including color data and a depth value for each pixel, said image processing program causing said computer to execute:
detecting for detecting a focused position,
calculating for each pixel a difference between a depth value of the pixel and a depth value of said focused position which are included in said rendering data, and calculating a blurring range on the basis of said difference,
generating color data which is subjected to a blurring processing as to blurring objective pixels specified on the basis of said blurring range, and
generating display image data on the basis of the color data generated by said color data generating, wherein
said generating the color data includes blurring objective pixel specifying for specifying blurring objective pixels, wherein
said specifying blurring objective pixels includes matching for matching said blurring range and blurring shape data set in advance to specify the blurring objective pixels, wherein
said generating the color data includes calculating a diffusion value of each of the pixels included in said calculated blurring range and changing, on the basis of said diffusion value, the color data included in said rendering data of the pixel determined as a blur object by said matching, and wherein
said calculating the diffusion value includes calculating a weight on the basis of an arithmetic expression which is proportional to a size of the color data of each pixel included in said rendering data and is inversely proportional to a size of said blurring range, and said diffusion value is calculated on the basis of said weight.

9. A method for displaying a virtual three-dimensional image by utilizing rendering data including color data and a depth value for each pixel, the method comprising:
detecting a focused position,
calculating for each pixel a difference between a depth value of the pixel and a depth value of said focused position which are included in said rendering data, and calculating a blurring range on the basis of said difference, wherein said blurring range is proportional to said difference with the proportionality factor being equal to the F-number of a lens,
generating color data which is subjected to blurring processing with respect to the blurring objective pixels specified on the basis of said blurring range, and
generating, using a computer system having at least one computer processor, display image data on the basis of the color data generated by said color data generating.

10. A method for displaying a virtual three-dimensional image by utilizing rendering data including color data and a depth value for each pixel, the method comprising:
detecting a focused position,
calculating for each pixel a difference between a depth value of the pixel and a depth value of said focused position which are included in said rendering data, and calculating a blurring range on the basis of said difference,
generating color data which is subjected to blurring processing with respect to the blurring objective pixels specified on the basis of said blurring range, and
generating, using a computer system having at least one computer processor, display image data on the basis of the color data generated by said color data generating, wherein
said generating color data includes specifying blurring objective pixels, wherein
said specifying blurring objective pixel includes matching said blurring range and blurring shape data set in advance to specify the blurring objective pixels, wherein
said generating color data includes calculating a diffusion value of each of the pixels included in said calculated blurring range and changing, on the basis of said diffusion value, the color data included in said rendering data of the pixel determined as a blur object by said matching, and wherein
said calculating the diffusion value includes calculating a weight on the basis of an arithmetic expression which is proportional to a size of the color data of each pixel included in said rendering data and is inversely proportional to a size of said blurring range, and said diffusion value is calculated on the basis of said weight.

11. An image processing system for displaying a virtual three-dimensional image by utilizing rendering data including color data and a depth value for each pixel, the image processing system comprising:
a computer processor configured to:
detect a focused position,
calculate for each pixel a difference between a depth value of the pixel and a depth value of said focused position which are included in said rendering data, and calculate a blurring range on the basis of said difference, wherein said blurring range is proportional to said difference with the proportionality factor being equal to the F-number of a lens,
generate color data which is subjected to blurring processing with respect to the blurring objective pixels specified on the basis of said blurring range, and
generate display image data on the basis of the color data generated by said color data generating.

12. An image processing system for displaying a virtual three-dimensional image by utilizing rendering data including color data and a depth value for each pixel, the image processing system comprising:
  a computer processor configured to:
    detect a focused position,
    calculate for each pixel a difference between a depth value of the pixel and a depth value of said focused position which are included in said rendering data, and calculate a blurring range on the basis of said difference,
    generate color data which is subjected to blurring processing with respect to the blurring objective pixels specified on the basis of said blurring range, and
    generate display image data on the basis of the color data generated by said color data generating, wherein
    said generated color data includes specified blurring objective pixels, wherein
    said specified blurred objective pixels are matched with said blurring range and blurring shape data set in advance to specify the blurring objective pixels, wherein
    said generated color data includes a diffusion value calculated for each of the pixels included in said blurring range calculated by said blurring range calculating, and changed color data, on the basis of said diffusion value, of the color data included in said rendering data of the pixel determined as a blur object by said matching, and wherein
    said calculated diffusion value includes a weight calculated on the basis of an arithmetic expression which is proportional to a size of the color data of each pixel included in said rendering data and is inversely proportional to a size of said blurring range, and said diffusion value is calculated on the basis of said weight.

13. An image processing apparatus for displaying a virtual three-dimensional image by utilizing rendering data including color data and a depth value for each pixel, the image processing apparatus comprising:
  a detector for detecting a focused position,
  a blurring range calculator for calculating for each pixel a difference between a depth value of the pixel and a depth value of said focused position which are included in said rendering data, and for calculating a blurring range on the basis of said difference, wherein said blurring range is proportional to said difference with the proportionality factor being equal to the F-number of a lens,
  a color data generator for generating color data which is subjected to blurring processing with respect to the blurring objective pixels specified on the basis of said blurring range, and
  a display for generating display image data on the basis of the color data generated by said color data generator.

14. An image processing apparatus for displaying a virtual three-dimensional image by utilizing rendering data including color data and a depth value for each pixel, the image processing apparatus comprising:
  a detector for detecting a focused position,
  a blurring range calculator for calculating for each pixel a difference between a depth value of the pixel and a depth value of said focused position which are included in said rendering data, and for calculating a blurring range on the basis of said difference,
  a color data generator for generating color data which is subjected to blurring processing with respect to the blurring objective pixels specified on the basis of said blurring range, and
  a display for generating display image data on the basis of the color data generated by said color data generator, wherein
  said color data generator includes a blurring objective pixel specifier for specifying blurring objective pixels, wherein
  said blurring objective pixel specifier includes a matcher for matching said blurring range and blurring shape data set in advance to specify the blurring objective pixels, wherein
  said generated color data includes a diffusion value calculated for each of the pixels included in said blurring range calculated by said blurring range calculator, and changed color data, on the basis of said diffusion value, of the color data included in said rendering data of the pixel determined as a blur object by said matching, and wherein
  said calculated diffusion value includes a weight calculated on the basis of an arithmetic expression which is proportional to a size of the color data of each pixel included in said rendering data and is inversely proportional to a size of said blurring range, and said diffusion value is calculated on the basis of said weight.

15. An image processing apparatus which displays a virtual three-dimensional image by utilizing rendering data including color data and a depth value for each pixel, comprising:
  detecting programmed logic circuitry for detecting a focused position,
  blurring range calculating programmed logic circuitry for calculating for each pixel a difference between a depth value of the pixel and a depth value of said focused position which are included in said rendering data, and calculating a blurring range on the basis of said difference, wherein said blurring range is proportional to said difference with the proportionality factor being equal to the F-number of a lens,
  color data generating programmed logic circuitry for generating color data which is subjected to blur processing with respect to the blurring objective pixels specified on the basis of said blurring range, and
  display image generating programmed logic circuitry for generating display image data on the basis of the color data generated by said color data generating programmed logic circuitry.

* * * * *